(12) United States Patent
Walters et al.

(10) Patent No.: US 7,896,075 B2
(45) Date of Patent: Mar. 1, 2011

(54) SUBTERRANEAN TREATMENT FLUIDS WITH ENHANCED PARTICULATE TRANSPORT OR SUSPENSION CAPABILITIES AND ASSOCIATED METHODS

(75) Inventors: Harold G. Walters, Duncan, OK (US); Jason E. Bryant, Duncan, OK (US); Phillip C. Harris, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 229 days.

(21) Appl. No.: 12/025,150

(22) Filed: Feb. 4, 2008

(65) Prior Publication Data

US 2009/0194288 A1 Aug. 6, 2009

(51) Int. Cl.
*E21B 43/267* (2006.01)
*C09K 8/80* (2006.01)

(52) U.S. Cl. .............. 166/280.1; 166/308.2; 166/308.3; 507/211; 507/213; 507/922; 507/924; 507/925

(58) Field of Classification Search ........................ None
See application file for complete search history.

(56) References Cited

U.S. PATENT DOCUMENTS

| | | | | |
|---|---|---|---|---|
| 3,537,525 | A * | 11/1970 | Sarem | 166/308.2 |
| 3,858,658 | A * | 1/1975 | Strubhar et al. | 166/308.1 |
| 5,249,628 | A | 10/1993 | Surjaatmadja | 166/308 |
| 5,325,923 | A | 7/1994 | Surjaatmadja et al. | 166/308 |
| 5,396,957 | A | 3/1995 | Surjaatmadja et al. | 166/308 |
| 5,499,678 | A | 3/1996 | Surjaatmadja et al. | 166/298 |
| 5,558,161 | A * | 9/1996 | Vitthal et al. | 166/280.1 |
| 5,759,964 | A * | 6/1998 | Shuchart et al. | 507/209 |
| 5,765,642 | A | 6/1998 | Surjaatmadja | 166/297 |
| 5,950,731 | A * | 9/1999 | Shuchart et al. | 166/300 |
| 6,782,735 | B2 | 8/2004 | Walters et al. | 73/52.28 |
| 7,114,560 | B2 | 10/2006 | Nguyen et al. | |
| 7,273,099 | B2 | 9/2007 | East, Jr. et al. | |
| 2008/0064614 | A1* | 3/2008 | Ahrenst et al. | 507/209 |
| 2008/0196895 | A1* | 8/2008 | Watters et al. | 166/280.2 |

OTHER PUBLICATIONS

Harris, et al., *Measurement of Proppant Transport of Frac Fluids*, SPE 95287, Society of Professional Engineers, 2005.
Halliburton brochure entitled *AquaStim$^{SM}$ Water Frac Service*, 2007.
K. Nishinari, *Polysaccharide Rheology and In-Mouth Perception*, in A.M. Stephen (Ed.), Food Polysaccharides and their applications, Marcel Dekker, NY, pp. 541-588, 2006.
H. Khouryieh, *Rheological Characterization of Xanthan-Guar Mixtures in Dilute Solutions*, 2006.

(Continued)

*Primary Examiner*—George Suchfield
(74) *Attorney, Agent, or Firm*—Robert A. Kent; McDermott Will & Emery LLP

(57) ABSTRACT

Subterranean treatment fluids that exhibit enhanced particulate transport or suspension capabilities, and associated methods of use in certain subterranean treatments are provided. In one embodiment, the methods comprise: providing a linear gelled fluid that comprises an aqueous base fluid, a plurality of particulates, and a linear particulate transport enhancing additive, the linear gelled fluid having a certain yield stress, crossover frequency, and/or particulate settling time; introducing the linear gelled fluid into the subterranean formation; and using the linear gelled fluid to create or enhance at least one fracture in at least a portion of the subterranean formation.

12 Claims, 25 Drawing Sheets

OTHER PUBLICATIONS

Product Data Sheet, BARAZAN®, Halliburton Fluid Systems, 2006.
Product Data Sheet, BARAZAN® D, Halliburton Fluid Systems, 2006.
Product Data Sheet, BARAZAN® D PLUS, Halliburton Fluid Systems, 2006.
Product Data Sheet, BARAZAN® L, Halliburton Fluid Systems, 2006.
Walters et al., Abstract, New Frac Fluid provides Excellent Proppant Transport and High Conductivity, submitted to Society of Petroleum Engineers on Jan. 28, 2008.

* cited by examiner

SUBTERRANEAN TREATMENT FLUIDS WITH ENHANCED PARTICULATE TRANSPORT OR SUSPENSION CAPABILITIES AND ASSOCIATED METHODS

BACKGROUND

The present invention relates to subterranean treatment fluids, and more specifically, to subterranean treatment fluids that exhibit enhanced particulate transport or suspension capabilities, and associated methods of use in certain subterranean treatments.

Treatment fluids may be used in a variety of subterranean treatments. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof. Examples of common subterranean treatments include, but are not limited to, drilling operations, pre-pad treatments, fracturing operations, perforation operations, preflush treatments, afterflush treatments, sand control treatments (e.g., gravel packing), acidizing treatments (e.g., matrix acidizing or fracture acidizing), cementing treatments, and well bore clean-out treatments. For example, in certain fracturing treatments generally a treatment fluid (e.g., a fracturing fluid or a "pad fluid") is introduced into a well bore that penetrates a subterranean formation at a sufficient hydraulic pressure to create or enhance one or more pathways, or "fractures," in the subterranean formation. These cracks generally increase the permeability of that portion of the formation. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore penetrating the formation.

Treatment fluids are also utilized in sand control treatments, such as gravel packing. In "gravel-packing" treatments, a treatment fluid suspends particulates (commonly referred to as "gravel particulates"), and at least a portion of those particulates are then deposited in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation sand from occluding the screen or migrating with the produced hydrocarbons, and the screen acts, inter alia, to prevent the particulates from entering the well bore. The gravel particulates also may be coated with certain types of materials, including resins, tackifying agents, and the like. Once the gravel pack is substantially in place, the viscosity of the treatment fluid may be reduced to allow it to be recovered. In some situations, fracturing and gravel-packing treatments are combined into a single treatment (commonly referred to as "FracPac™" operations). In such "FracPac™" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in the treatment fluids used in these operations is important for a number of reasons. Maintaining sufficient viscosity is important in fracturing and sand control treatments for particulate transport and/or to create or enhance fracture width. Also, maintaining sufficient viscosity may be important to control and/or reduce fluid loss into the formation. At the same time, while maintaining sufficient viscosity of the treatment fluid often is desirable, it may also be desirable to maintain the viscosity of the treatment fluid in such a way that the viscosity also may be reduced easily at a particular time, inter alia, for subsequent recovery of the fluid from the formation.

To provide the desired viscosity, gelling agents commonly are added to the treatment fluids. The term "gelling agent" is defined herein to include any substance that is capable of increasing the viscosity of a fluid, for example, by forming a gel. In some cases, certain types of surfactants (e.g., viscoelastic surfactants) are used as gelling agents. To further increase the viscosity of a treatment fluid, often gelling agents are crosslinked with the use of a crosslinking agent. Conventional crosslinking agents may comprise a borate ion, a metal ion, or the like, and interact with at least two gelling agent molecules to form a crosslink between them, thereby forming a "crosslinked gelling agent." Treatment fluids comprising crosslinked gelling agents also may exhibit elastic and/or viscoelastic properties, wherein the crosslinks between gelling agent molecules may be broken and reformed, allowing the viscosity of the fluid to vary with certain conditions such as temperature, pH, and the like.

The use of these gelling agents, however, may be problematic. First, many such gelling agents must be crosslinked in order to impart the desired level of viscosity to the fluid. Such crosslinking agents may require careful control of fluid conditions (e.g., pH) in order to be effective, which generally increases the expense and complexity of the fluid. Certain surfactants also may require careful control of fluid conditions such as pH to function effectively as a gelling agent. Moreover, some gelling agents and crosslinked fluids may leave an undesirable gel residue in the subterranean formation after use, which may impact permeability. As a result, costly remedial operations may be required to clean up the area in the subterranean formation where these treatment fluids have been used. Foamed treatment fluids and emulsion-based treatment fluids have been employed to minimize residual damage, but increased expense and complexity often have resulted.

SUMMARY

The present invention relates to subterranean treatment fluids, and more specifically, to subterranean treatment fluids that exhibit enhanced particulate transport capabilities, and associated methods of use in certain subterranean treatments.

In one embodiment, the present invention provides methods comprising: providing a linear gelled fluid that comprises an aqueous base fluid, a plurality of particulates, and a linear particulate transport enhancing additive, the linear gelled fluid having at least one of the following properties: (a) a yield stress that satisfies the following inequality:

$$\frac{(\rho_p - \rho_f)g_c R}{\tau_0} < 3$$

wherein $\tau_0$ is the yield stress in units of Pascals, wherein $\rho_p$ is the mean density of the particulates with units of kilograms per meter cubed, $\rho_f$ is the density of the fluid with units of kilograms per meter cubed, $g_c$ is the gravitational acceleration constant defined as 9.8 meters per second squared, R is the mean radius of the particulates with units of meters, (b) a crossover frequency at the temperature in a portion of a subterranean formation where the linear gelled fluid is introduced of less than about 0.01 radians per second, or (c) a particulate settling time of the linear gelled fluid that is at least about 300 per cent longer than the particulate settling time of a standard linear guar gel; introducing the linear gelled fluid into the subterranean formation; and using the linear gelled fluid to create or enhance at least one fracture in at least a portion of the subterranean formation.

In another embodiment, the present invention provides methods comprising: providing a linear gelled fluid that comprises an aqueous base fluid, a plurality of particulates, and a linear particulate transport enhancing additive, the linear gelled fluid having at least one of the following properties: (a) a yield stress that satisfies the following inequality:

$$\frac{(\rho_p - \rho_f)g_c R}{\tau_0} < 3$$

wherein $\tau_0$ is the yield stress in units of Pascals, wherein $\rho_p$ is the mean density of the particulates with units of kilograms per meter cubed, $\rho_f$ is the density of the fluid with units of kilograms per meter cubed, $g_c$ is the gravitational acceleration constant defined as 9.8 meters per second squared, R is the mean radius of the particulates with units of meters, (b) a crossover frequency at the temperature in a portion of a subterranean formation where the linear gelled fluid is introduced of less than about 0.01 radians per second, or (c) a particulate settling time of the linear gelled fluid that is at least about 300 per cent longer than the particulate settling time of a standard linear guar gel; introducing the linear gelled fluid into the subterranean formation; and depositing at least a portion of the particulates in the linear gelled fluid in a portion of the subterranean formation so as to form a gravel pack in a portion of the subterranean formation.

In another embodiment, the present invention provides linear gelled treatment fluids comprising an aqueous base fluid, a plurality of proppant particulates, and a linear particulate transport enhancing additive, wherein the linear gelled treatment fluid has at least one of the following properties: (a) a yield stress that satisfies the following inequality:

$$\frac{(\rho_p - \rho_f)g_c R}{\tau_0} < 3$$

wherein $\tau_0$ is the yield stress in units of Pascals, wherein $\rho_p$ is the mean density of the particulates with units of kilograms per meter cubed, $\rho_f$ is the density of the fluid with units of kilograms per meter cubed, $g_c$ is the gravitational acceleration constant defined as 9.8 meters per second squared, R is the mean radius of the particulates with units of meters; (b) a crossover frequency of less than about 0.01 radians per second; or (c) a particulate settling time of the linear gelled fluid that is at least about 300 per cent longer than the particulate settling time of a standard linear guar gel.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
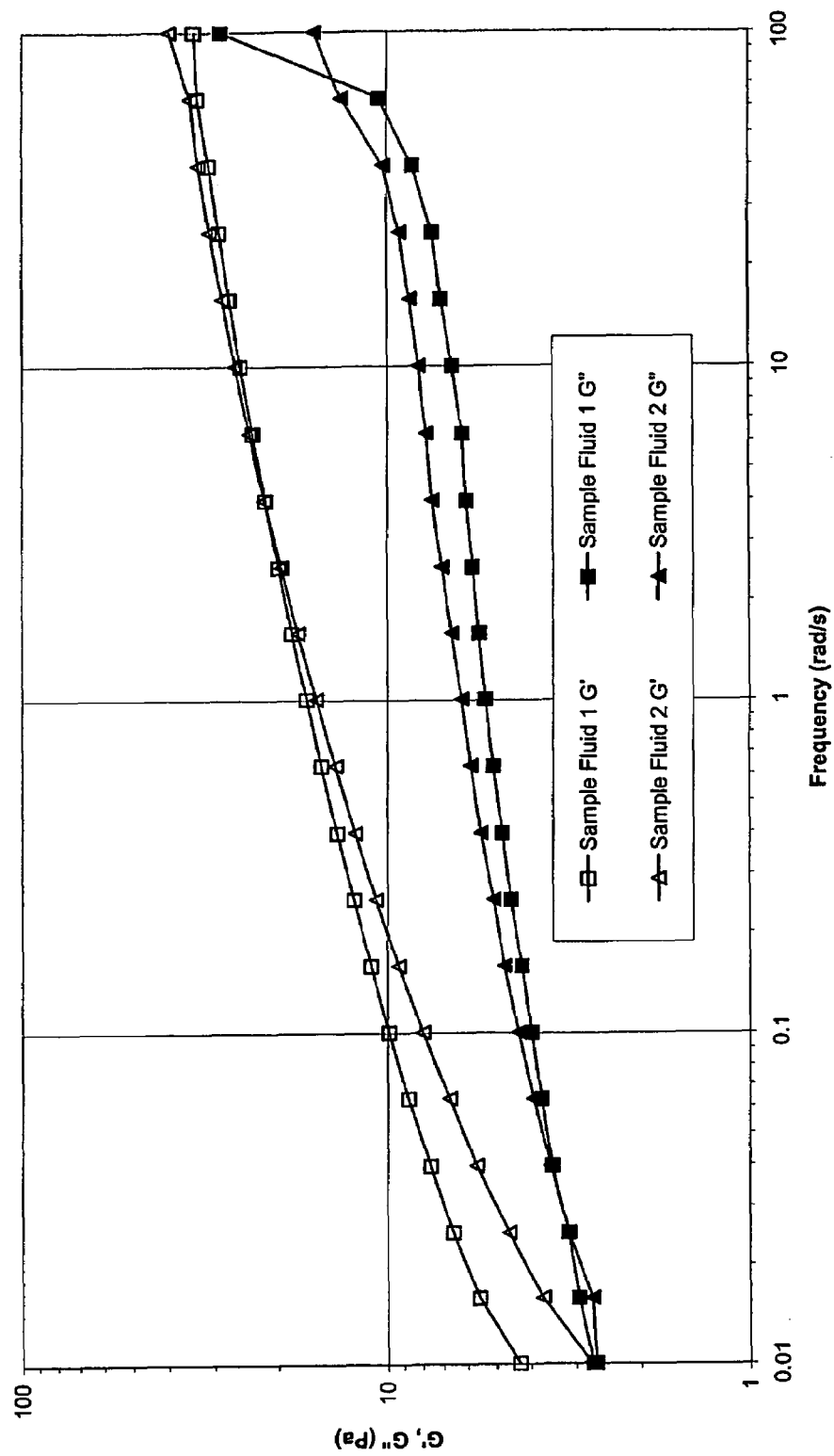
FIG. 1 illustrates data regarding certain properties of various treatment fluids, some of which represent embodiments of the treatment fluids of the present invention.

The present invention relates to subterranean treatment fluids, and more specifically, to subterranean treatment fluids that exhibit enhanced particulate transport or suspension capabilities, and associated methods of use in certain subterranean treatments.

Several terms are used herein to describe the present invention. Certain of these terms are defined below. The term "yield stress" is defined herein to refer to the minimum level of shear stress that must be applied to a material for it to flow as a fluid. Yield stress may be determined by any means or method of measurement known in the art (e.g., measuring the residual stress of a fluid after cessation of steady shear flow).

The term "crossover frequency" is defined herein to refer to the frequency at which the storage modulus and loss modulus of the fluid are equal and the loss modulus becomes larger than the storage modulus as frequency decreases, as determined with a small-amplitude oscillatory shear (SAOS) frequency sweep test.

The term "particulate settling time" is defined herein to refer to the amount of time required for the particulates suspended in a fluid to settle to the bottom of the fluid such that no substantial amount of the particulates remains suspended in the fluid.

The term "standard linear guar gel" is defined herein as a fluid gelled with a non-derivatized linear (i.e., not crosslinked by an external crosslinking agent) guar having a molecular weight of 2 million Daltons to have substantially the same viscosity at 25° C. as a linear gelled fluid of the present invention, as measured on a Fann® 35 viscometer with an R1 sleve and B1 bob at a steady shear rate of 511 s$^{-1}$. For example, the non-derivatized linear guar may be WG-36™ gelling agent (available from Halliburton Energy Services, Inc., Duncan, Okla).

A "linear gelled fluid," as that term is used herein, refers to a fluid that does not contain a substantial amount of an external crosslinking agent. The linear gelled fluids of the present invention generally comprise an aqueous base fluid, a plurality of particulates, and a linear particulate transport enhancing additive that is capable of imparting a desired particulate transport or suspension capability to a fluid. Among the many potential advantages of the present invention, some of which may be alluded to herein, the linear gelled fluids of the present invention may, relative to certain fluids used in the art, reduce pipe friction, reduce residue left on surfaces with which the fluid comes into contact, and/or increase conductivity or regain permeability in subterranean formations in which the fluid has been used. Among many other potential advantages, this may permit the use of produced water as the base fluid for the linear gelled fluids of the present invention.

The term "linear particulate transport enhancing additive" is defined herein to include any material: (1) that is capable of imparting a desired particulate transport or suspension capability to a fluid, and (2) whose molecules are not crosslinked by an external crosslinking agent (i.e., linear). In certain embodiments of the present invention, the particular linear particulate transport enhancing additive used may be selected specifically for its ability to impart a desired particulate transport or suspension capability to a fluid.

The term "polymeric" is defined herein to refer to any substance (e.g., an additive) whose molecules are composed of several smaller repeating units that are covalently bonded together and typically have a high molecular weight. This term may include oligomers.

The linear gelled fluids of the present invention have at least one of the following properties:

(a) a yield stress ($\tau_0$) with units of Pascals satisfying the following inequality:

$$\frac{(\rho_p - \rho_f)g_c R}{\tau_0} < 3$$

wherein $\rho_p$ is the mean density of the particulates to be included in the fluid with units of kilograms per meter cubed, $\rho_f$ is the density of the fluid with units of kilograms per meter cubed, $g_c$ is the gravitational acceleration constant defined as 9.8 meters per second squared, R is the mean radius of the particulates with units of meters;

(b) a crossover frequency at the temperature in the portion of the subterranean formation where the linear gelled fluid of the present invention is introduced is less than about 0.01 radians per second; or (c) a particulate settling time that is at least about 300 per cent longer than the settling time of a standard linear guar gel.

The temperature in the portion of the subterranean formation where the linear gelled fluids of the present invention are introduced may affect whether a particular material is capable of imparting a desired particulate transport or suspension capability to a fluid in a particular embodiment of the present invention. In certain embodiments, the temperature in at least a portion of the subterranean formation may be at least about 150° F. In certain embodiments, the linear particulate transport enhancing additives included in the linear gelled fluids of the present invention may be capable of imparting a desired particulate transport or suspension capability to a fluid at or above a particular temperature whereas conventional linear gelling agents may not be capable of doing so at the same temperature.

In certain embodiments, the yield stress ($\tau_0$) in units of Pascals of a linear gelled fluid of the present invention satisfies the following inequality:

$$\frac{(\rho_p - \rho_f)g_c R}{\tau_0} < 3$$

wherein $\rho_p$ is the mean density of the particulates to be included in the fluid with units of kilograms per meter cubed, $\rho_f$ is the density of the fluid with units of kilograms per meter cubed, $g_c$ is the gravitational acceleration constant defined as 9.8 meters per second squared, R is the mean radius of the particulates with units of meters. In certain embodiments, the yield stress ($\tau_0$) of a linear gelled fluid of the present invention is determined with Brookfield DV-II+ viscometer fitted with a 6-bladed vane with a height to diameter ratio of 2 or by a Fann® 35 fitted with a Fann Yield Stress Adapter (FYSA) at the temperature in the portion of the subterranean formation where the fluid is introduced.

Figure 2:
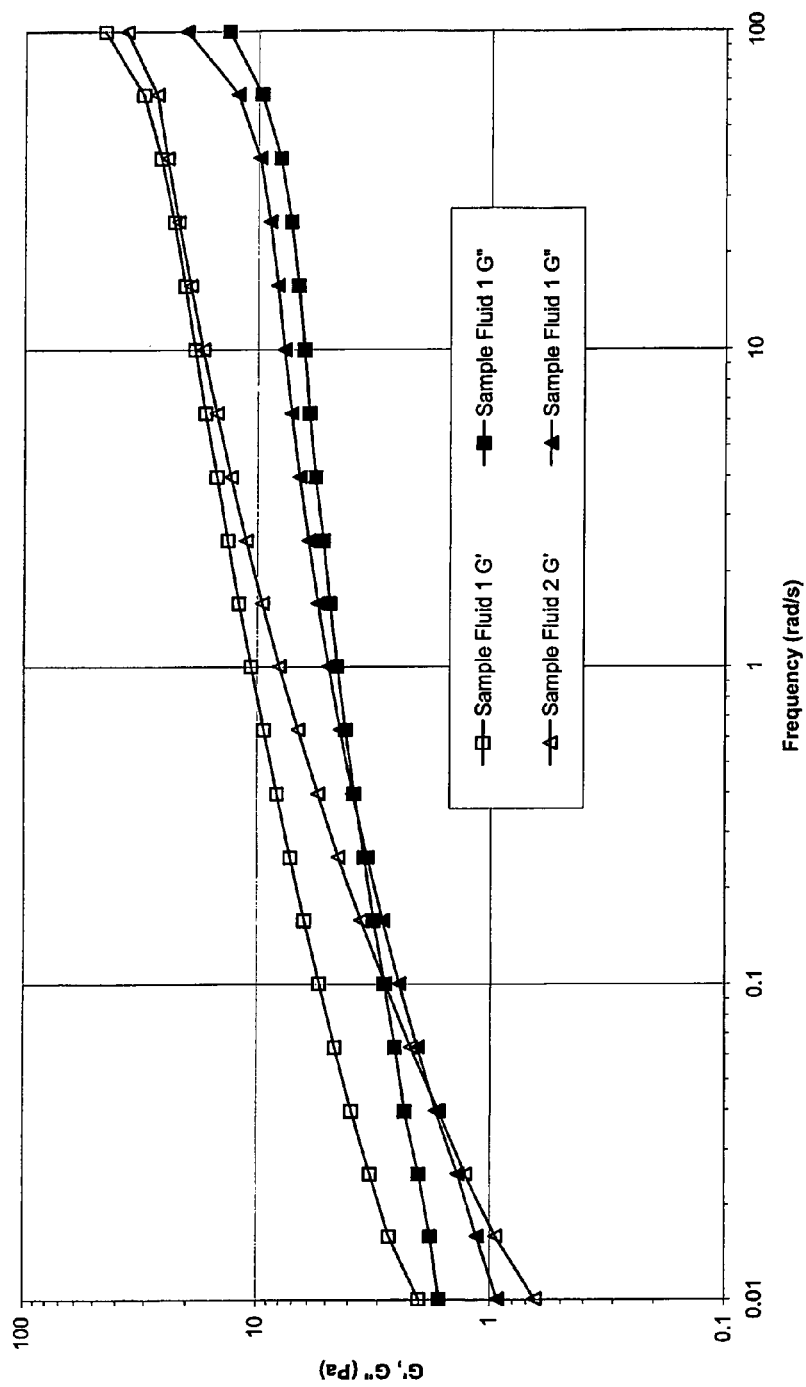
FIG. 2 illustrates data regarding certain properties of various treatment fluids, some of which represent embodiments of the treatment fluids of the present invention.
Figure 8:
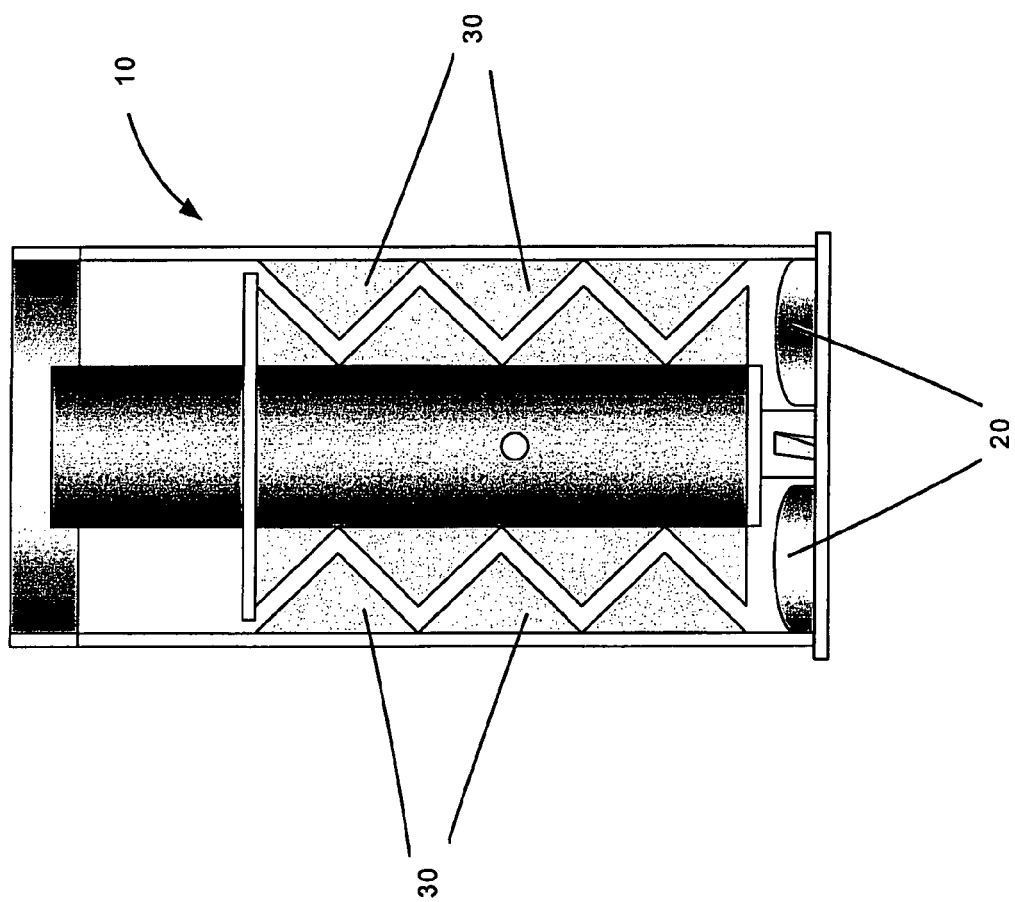
FIG. 8 is a drawing of a portion of a device used to collect certain data regarding various treatment fluids, including certain embodiments of the treatment fluids of the present invention.

In certain embodiments, the particulate settling time of a linear gelled fluid of the present invention may be at least about 300 per cent longer than the particulate settling time of a standard linear guar gel. As noted above, the "particulate settling time" is defined to refer to the amount of time required for the particulates suspended in a fluid to settle to the bottom of the fluid such that no substantial amount of the particulates remains suspended in the fluid. In certain embodiments, this may be determined by visual inspection (for example, as described in Example 4 of this specification). In other embodiments, the particulate settling time may be determined by calculating the time at which the volume-averaged viscosity of the fluid stops increasing and maintains a substantially constant value in a dynamic particulate settling test. Methods and apparatuses that may be used to perform these tests are further described in U.S. Pat. No. 6,782,735 (the entire disclosure of which is herein incorporated by reference) and in Harris et al., "Measurement of Proppant Transport of Frac Fluids," Society of Petroleum Engineers, Paper No. SPE 95287-MS (2005) (available from the Society of Petroleum Engineers at http://www.spe.org/spe-app/spe/papers/elibrary/index.htm). A commercially available example of a device that may be used to perform these tests is a MIMIC™ device, available from Halliburton Energy Services, Inc., Duncan, Okla. In certain embodiments, the cup on the device described in these references (for example, as shown in FIG. 2 of U.S. Pat. No. 6,782,735) may be modified in various ways, for example, as depicted in FIG. 8 of this specification. As shown in FIG. 8, the cup 10 may include special flags 20 at the bottom of the cup and slanted flags 30 along the height of the cup. The precise configuration of the apparatus used to perform a dynamic particulate settling test may affect the settling time of the fluid being tested. In comparing any particular fluid with a standard linear guar gel as recited in certain embodiments of the present invention, the fluid in question and the standard linear guar gel should be tested on devices of the same configuration to ensure comparability of the results.

The linear particulate transport enhancing additive(s) included in the linear gelled fluids of the present invention may be any material: (1) that is capable of imparting a desired particulate transport or suspension capability to a fluid, and (2) whose molecules are not crosslinked by an external crosslinking agent (i.e., linear). In certain embodiments, the linear particulate transport enhancing additive(s) of the present invention may be polymeric additives. Examples of such additives may include, but are not limited to certain types of biopolymers (e.g., polysaccharides, xanthans, diutans, scleroglucans, celluloses, and derivatives thereof), synthetic polymers, clays, and the like. Commercially available examples of suitable particulate transport enhancing additives for use in conjunction with the present invention may include products sold under the tradenames BARAZAN®, BARAZAN-D®, and BARAZAN-D-PLUS® (high-molecular-weight polysaccharide biopolymers available from Halliburton Energy Services, Inc., Baroid Fluid Services Product Service Line, at multiple locations).

The linear particulate transport enhancing additive(s) should be present in a linear gelled fluid of the present invention in an amount sufficient to impart the desired particulate transport or suspension capabilities to the fluid. In certain embodiments, the amount of linear particulate transport enhancing additive(s) included in a linear gelled fluid of the present invention may be less than about 20 pounds per 1000 gallons of fluid ("pptg"). In some embodiments, the amount of linear particulate transport enhancing additive(s) used in a linear gelled fluid of the present invention may vary from about 0.25 pptg to about 200 pptg. In other embodiments, the amount of linear particulate transport enhancing additive(s) included in a linear gelled fluid of the present invention may vary from about 2 pptg to about 120 pptg. In other embodiments, the amount of linear particulate transport enhancing additive(s) included in a linear gelled fluid of the present invention may vary from about 20 pptg to about 90 pptg. In another embodiment, about 60 pptg of a linear particulate transport enhancing additive is included in a linear gelled fluid of the present invention. It should be noted that in well bores comprising bottom hole temperatures of 200° F. or more, 70 pptg or more of the linear particulate transport enhancing additive(s) may be used beneficially in a linear gelled fluid of the present invention. The amount of the linear particulate transport enhancing additive(s) included in a linear gelled fluid of the present invention may depend, at least in part, on a number of factors, including but not limited to the intended use of the fluid, the type and/or amount of particulates to be included in the fluid, the desired duration of particulate transport or suspension, the distance that the fluid must transport the particulates, the temperature or other conditions present in the subterranean formation where the fluid is used, and/or the presence of other additives or characteristics in the fluid. A person of ordinary skill in the art, with the benefit of this disclosure, will be able to recognize an appropriate amount of the linear particulate transport enhancing additive(s) for a particular application of the present invention.

The linear particulate transport enhancing additives may be provided in any form that is suitable for the particular fluid and/or application of the present invention. In certain embodiments, the linear particulate transport enhancing additives may be provided as a liquid, gel, suspension, and/or solid (e.g., powder) additive that is admixed or incorporated into a fluid used in conjunction with the present invention. The linear particulate transport enhancing additives also may be present in a solid particulate form of any size or shape.

The aqueous base fluids in the linear gelled fluids of the present invention may comprise fresh water, saltwater (e.g., water containing one or more salts dissolved therein), brine, or seawater. Generally, the water may be from any source, provided that it does not contain components that might adversely affect the stability and/or performance of the linear gelled fluids of the present invention. For example, in certain embodiments, the aqueous base fluid may comprise water that has been produced from a subterranean formation (referred to herein as "produced water"). In certain embodiments, the density of an aqueous base fluid can be adjusted, among other purposes, to provide additional particulate transport and suspension in the linear gelled fluids of the present invention. In certain embodiments, the pH of the aqueous base fluid may be adjusted (e.g., by a buffer or other pH adjusting agent), among other purposes, to increase or decrease the particulate transport ability of the fluid and to reduce the viscosity of the linear gelled fluid (e.g., activate a breaker or other additive). In these embodiments, the pH may be adjusted to a specific level, which may depend on, among other factors, the types of linear particulate transport enhancing additive, acids, and other additives included in the fluid. One of ordinary skill in the art, with the benefit of this disclosure, will recognize when such density and/or pH adjustments are appropriate.

The particulates included in the linear gelled fluids of the present invention may comprise any particulate material known in the art. In certain embodiments, the particulates may be used, among other purposes, to form at least a portion of a gravel pack and/or a proppant pack within a subterranean formation prior to, subsequent to, or during a method of the present invention. Particulates may be comprised of any material suitable for use in subterranean operations. Examples include, but are not limited to, sand, bauxite, ceramic materials, glass materials (e.g., glass beads), polymer materials, TEFLON® (polytetrafluoroethylene) materials, nylon materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates, and the like. Composite particulates also may be used, wherein suitable composite materials may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, ground nut/seed shells or husks, saw dust, ground cellulose fiber, and the like. In certain embodiments, the particulates may be at least partially coated with a substance, such as a resin and/or a tackifying agent. In certain embodiments, the particulates have a size in the range of from about 2 to about 400 mesh, U.S. Sieve Series. In certain embodiments, particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials), strips, shavings, platelets, and the like, and mixtures thereof. Moreover, the particulates may comprise fibrous materials that may be used, inter alia, to bear the pressure of a closed fracture.

The linear gelled fluids of the present invention optionally may comprise one or more salts, among other purposes, to modify the rheological properties (e.g., viscosity) of the fluid. The salts may be organic or inorganic. Examples of suitable organic salts include but are not limited to aromatic sulfonates and carboxylates (such as p-toluene sulfonate, naphthalene sulfonate), hydroxynaphthalene carboxylates, salicylate, phthalate, chlorobenzoic acid, salicylic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts, (such as sodium chloride, potassium chloride, and ammonium chloride), calcium chloride, calcium bromide, magnesium chloride and zinc halide salts. Examples of fluids comprising salts that may be suitable for use in the present invention are described in U.S. patent application Ser. No. 10/800,478, the entire disclosure of which is incorporated herein by reference. Any combination of the salts listed above also may be included in the linear gelled fluids of the present invention.

The salt may be present in any amount that imparts the desired stability and/or other rheological properties to the linear gelled fluid of the present invention. In certain embodiments, the salt may be present in an amount of from about 0.05% to about 30% by weight of the fluid. In certain embodiments, the salt may be present in an amount of from about 0.1% to about 10% by weight of the fluid. In certain embodiments, the salt may be present in an amount of from about 0.5% to about 5% by weight of the fluid. The type and amount of salts suitable in a particular application of the present invention may depend upon a variety of factors, such as the type of linear particulate transport enhancing additive in the linear gelled fluid, the composition of the aqueous-base fluid, the temperature of the fluid, and the like. A person of ordinary skill, with the benefit of this disclosure, will recognize when to include a salt in a particular application of the present invention, as well as the appropriate type and amount of salts to include.

The linear gelled fluids of the present invention optionally may comprise one or more of any additional additives known in the art. Examples of such additional additives include, but are not limited to, soaps, co-surfactants, carboxylic acids, acids, bases, fluid loss control additives, gas, foamers, corrosion inhibitors, scale inhibitors, catalysts, clay control agents, iron control agents, pH control additives (e.g., buffers), breakers, biocides, friction reducers, antifoam agents, bridging agents, dispersants, flocculants, $H_2S$ scavengers, $CO_2$ scavengers, oxygen scavengers, lubricants, viscosifiers, weighting agents, relative permeability modifiers, resins, wetting agents, coating enhancement agents, and the like. A person skilled in the art, with the benefit of this disclosure, will recognize the types of additives that may be included in the linear gelled fluids for a particular application.

The linear gelled fluids of the present invention and/or any component thereof may be prepared at a job site, or they may be prepared at a plant or facility prior to use, and may be stored for some period of time prior to use. In certain embodiments, the preparation of these linear gelled fluids of the present invention may be done at the job site in a method characterized as being performed "on the fly." The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. These streams also may be held for a period of time, among other purposes, to facilitate polymer hydration prior to injection.

In certain embodiments, the methods and linear gelled fluids of the present invention may be used in conjunction with subterranean fracturing treatments. In these embodiments, the methods of the present invention comprise creating or enhancing at least one fracture in a portion of a subterranean formation. "Enhancing" one or more fractures in a subterranean formation, as that term is used herein, is defined to include the extension or enlargement of one or more natural or previously created fractures in the subterranean formation. In certain embodiments, the particulates in the linear gelled fluid of the present invention may be deposited in the fracture and, inter alia, may prevent the fracture from fully closing. In certain embodiments, the particulates in the linear gelled fluid of the present invention may be used to facilitate creating or enhancing the fracture.

In these embodiments, the fracture may be created or enhanced in a portion of the subterranean formation by any means known in the art. For example, in certain embodiments, the fracture may be created or enhanced by introducing a treatment fluid into a well bore that penetrates the subterranean formation at a sufficient hydraulic pressure to create or enhance one or more fractures in the subterranean formation. In certain embodiments, the linear gelled fluids and methods of the present invention may be used to create or enhance at least one fracture in a portion of a subterranean formation in conjunction with hydraulic fracturing techniques known as "waterfrac" techniques, for example, as performed in the AquaStims™ service, available from Halliburton Energy Services, Inc., Duncan, Okla.

In other embodiments, the fracture may be created or enhanced using pinpoint stimulation techniques, wherein specific intervals or portions of the subterranean may be isolated and/or selectively stimulated. Such methods may employ any number of methods or tools to divert a linear gelled fluid of the present invention to the area selected for stimulation, including but not limited to the following: diverting fluids, emulsions, gels, foams, degradable materials, and particulates; packers (e.g., pinpoint packers and selective injection packers); ball sealers; pack-off devices; sand plugs; bridge plugs; ported-sub assemblies; hydroblast tools; hydrajetting tools; and pulsonic tools. As used herein, the term "hydrajetting," and derivatives thereof, are defined herein to include the use of any method or tool wherein a treatment fluid is propelled at a surface inside a subterranean formation so as to erode at least a portion of that surface. This erosion may occur due to, inter alia, mechanical erosion and/or chemical erosion (e.g., acidizing, dissolving, corroding, etc.) performed by one or more components of the treatment fluid. In certain embodiments, hydrajetting techniques may comprise propelling a linear gelled fluid of the present invention comprising abrasive materials (e.g., the particulates in the linear gelled fluids of the present invention) and/or propelling a linear gelled fluid of the present invention at a sufficiently high pressure at the surface inside the subterranean formation so as to erode at least a portion of that surface. Examples of suitable hydrajetting techniques and tools are described in the following U.S. patents and patent applications, the entire disclosures of which are incorporated herein by reference: U.S. Pat. Nos. 5,765,642; 5,249,628; 5,325,923; 5,499,678; 5,396,957; and U.S. Patent Application Ser. No. 11/004,441. In certain embodiments, a pulsonic tool may be used to apply a pressure pulse having a given amplitude and frequency to a fluid to direct the flow of the fluid to the desired location. Examples of suitable pulsonic tools may include, but are not limited to, fluidic oscillators, and those devices described in U.S. Patent Application Ser. No. 10/863,706 by Nguyen, et al., the entire disclosure of which is incorporated herein by reference. In certain embodiments, a pipe string (e.g., coiled tubing, drill pipe, etc.) with at least one port (e.g., nozzle or jet) thereon may be used to direct the flow of fluid from within the pipe string into a subterranean formation in a desired direction. In certain embodiments, an uncemented liner having jets on the outer surface of the liner may be used in a similar fashion.

In certain embodiments, the linear gelled fluids and methods of the present invention may be used in conjunction with subterranean gravel packing treatments. In these embodiments, the methods of the present invention comprise depositing at least a portion of the particulates in a linear gelled fluid of the present invention in a portion of the subterranean formation so as to form a gravel pack in a portion of the subterranean formation. In certain embodiments, a sand control screen may be placed in a well bore penetrating the portion of the subterranean formation, and the particulates in a linear gelled fluid of the present invention may be deposited in the annulus between the screen and the well bore. In certain embodiments, the particulates may be of a specific size to hinder or prevent the passage of formation sand.

In certain embodiments, the linear gelled fluids and methods of the present invention may be used in conjunction with a "FracPac™" treatment, wherein a fracturing treatment and a gravel-packing treatment may be combined into a single treatment. In certain embodiments, the gravel-packing portion of the treatment may be at least partially performed first, followed by a fracturing treatment wherein a treatment fluid is pumped through the annular space between the casing and screen at a sufficient hydraulic pressure to create or enhance one or more fractures in the subterranean formation. In other embodiments, the fracturing treatment may be at least partially performed prior to the gravel-packing portion of the treatment.

To facilitate a better understanding of the present invention, the following examples of certain aspects of some embodiments are given. In no way should the following examples be read to limit, or define, the entire scope of the invention.

EXAMPLES

Example 1

Sample Fluid 1 of the present invention was prepared by mixing 70 pptg BARAZAN-D® in a solution of 1% by weight sodium chloride in tap water. Sample Fluid 2 comprising 80 pptg WG-37™ (a xanthan gelling agent available from Halliburton Energy Services, Inc., Duncan, Okla.) was mixed in a solution of 1% by weight sodium chloride in tap water for comparison with Sample Fluid 1. Each of these sample fluids was tested using a small-amplitude oscillatory shear (SAOS) test. The SAOS test was performed on each of the sample fluids using a Sealed Cell Cup and Bob on a Stresstech rheometer (available from Reologica Instruments, Inc., Bordentown, N.J.) at three different test temperatures (100° F., 150° F., and 200° F.). In this test, a sinusoidal shear strain is applied to the sample in the form of $\gamma=\gamma_0 \sin \omega t$, where $\gamma_0$ is the strain amplitude and $\omega$ is the oscillation frequency. The shear stress response is $\sigma=G' \sin \omega t + G'' \cos \omega t$, where $G'$ is the storage modulus in phase with the applied shear strain and $G''$ is the loss modulus out of phase with the applied shear strain (or in phase with the applied shear-strain rate).

Figure 3:
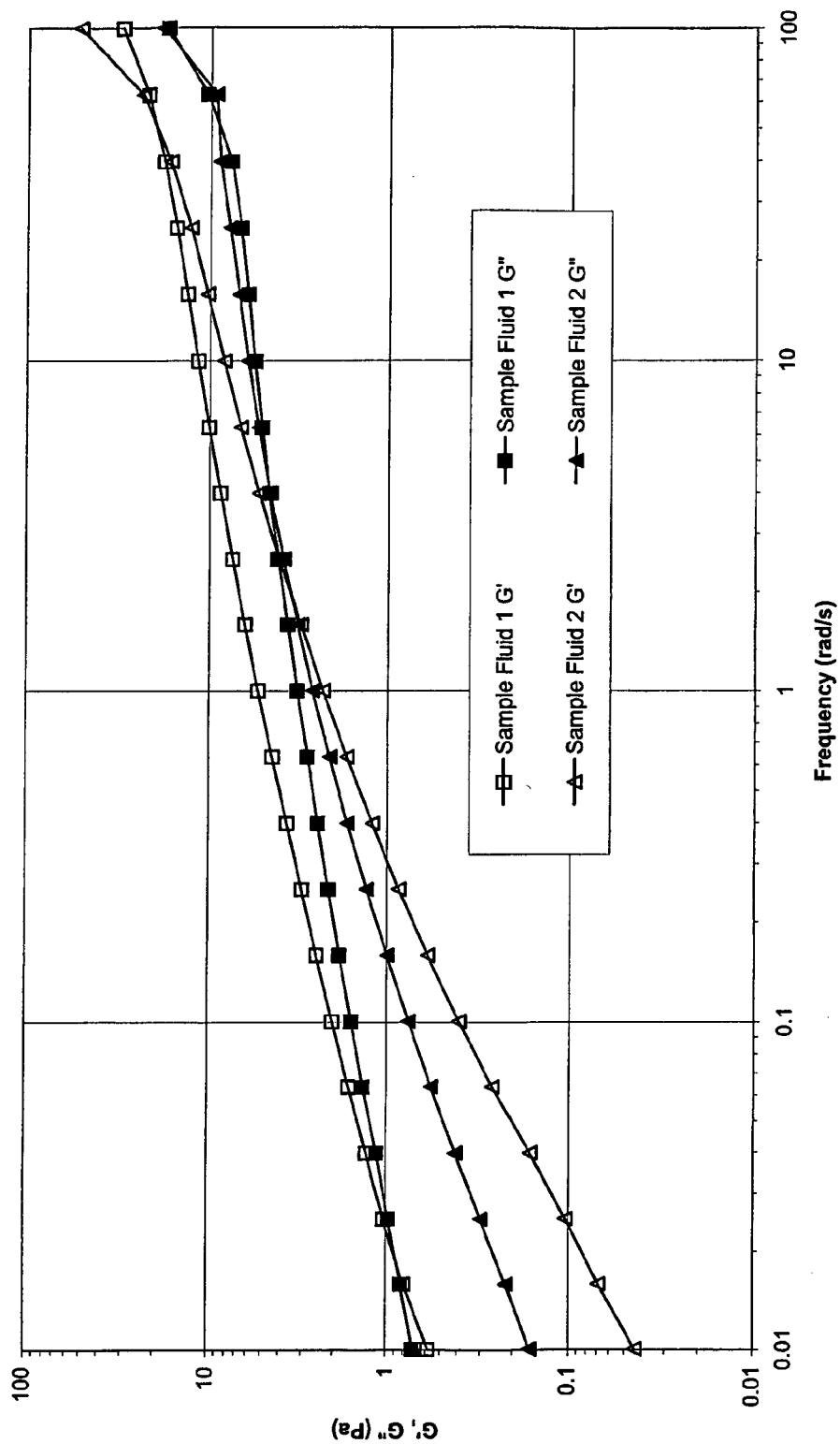
FIG. 3 illustrates data regarding certain properties of various treatment fluids, some of which represent embodiments of the treatment fluids of the present invention.

Plots of storage modulus and loss modulus versus frequency from the SAOS frequency sweep for each of the sample fluids at each of the three test temperatures is provided in FIGS. 1, 2, and 3. As shown in FIGS. 1, 2, and 3, the crossover frequency (i.e., the frequency at which the G'=G") in the lower frequency range of Sample Fluid 1 is lower than that of Sample Fluid 2, which is believed to indicate improved static particulate suspension properties of the fluid.

Figure 4:
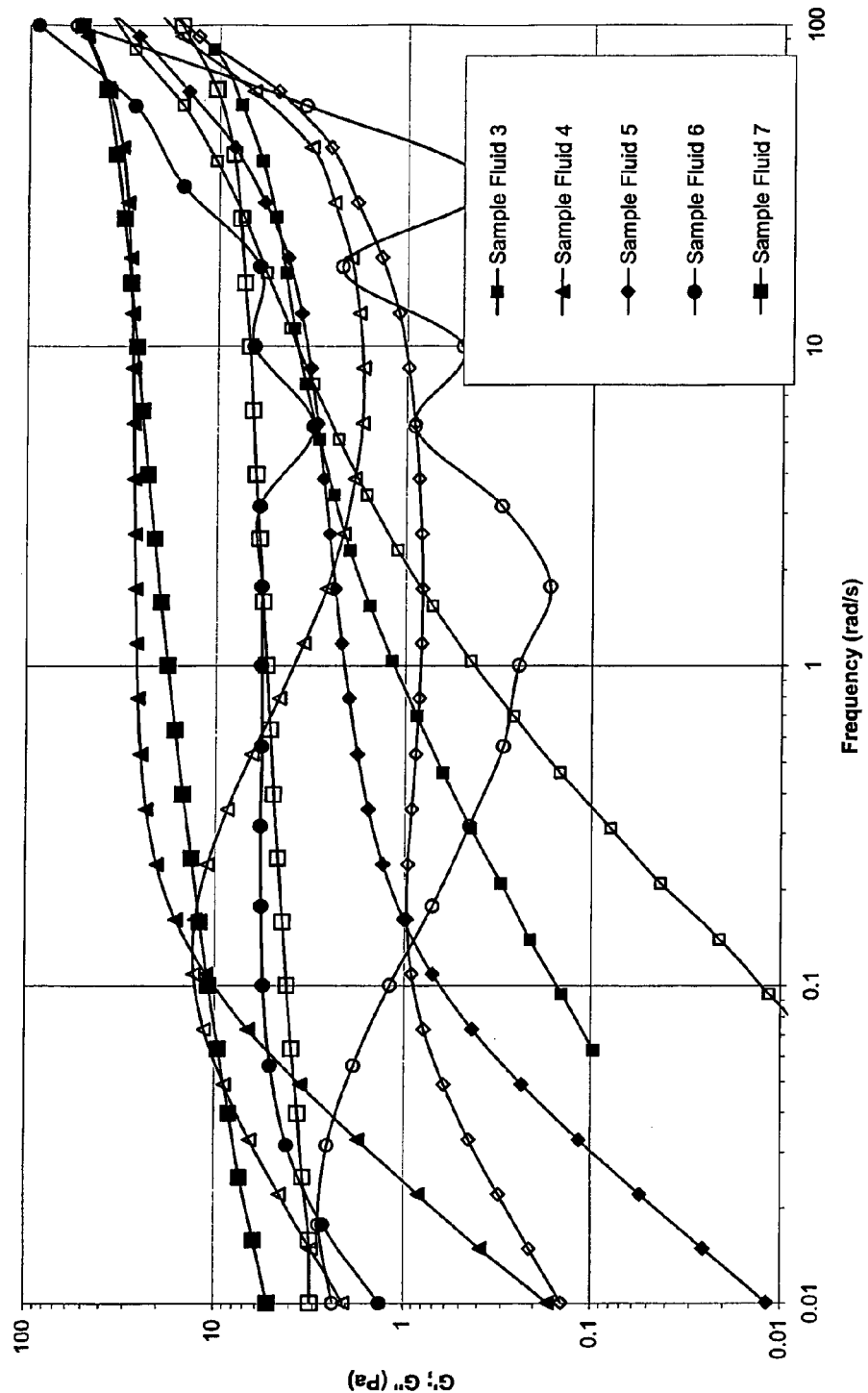
FIG. 4 illustrates data regarding certain properties of various treatment fluids, some of which represent embodiments of the treatment fluids of the present invention.
Figure 5:
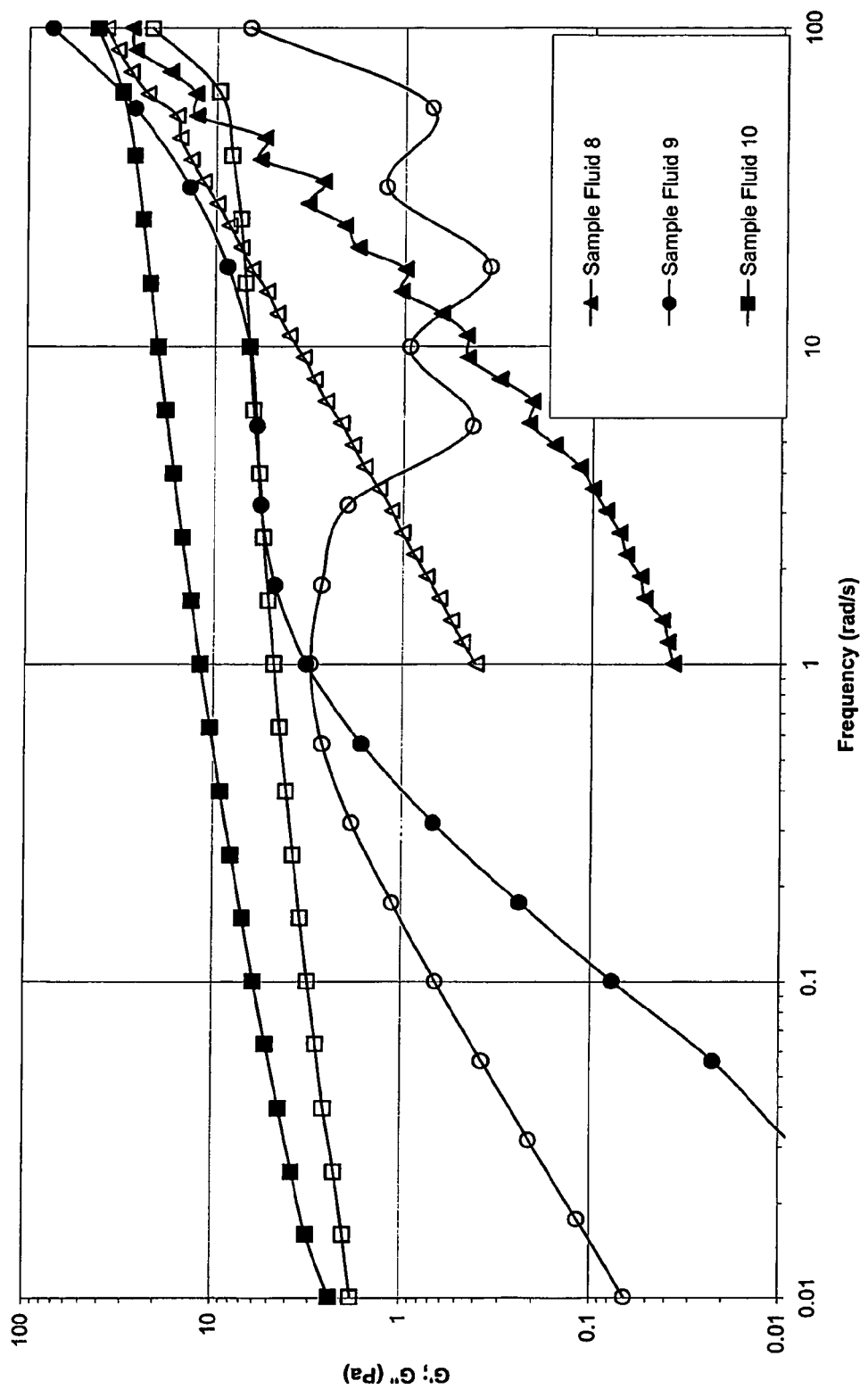
FIG. 5 illustrates data regarding certain properties of various treatment fluids, some of which represent embodiments of the treatment fluids of the present invention.

Several additional linear gelled fluid samples (Sample Fluids 3-10) were tested with the same SAOS frequency sweep test described above at temperatures ranging from 75° F. to 100° F. in one test (FIG. 4) and 150° F. to 160° F. in a second test (FIG. 5). Each sample fluid was made in tap water in addition to the components listed for each sample fluid in Table 1 below. The compositions of the sample fluids and the conditions at which they were tested are listed in Table 1 below. FIGS. 4 and 5, as listed in Table 1 below, show the plots of storage modulus and loss modulus versus frequency generated in these tests, as well as the crossover frequency (determined by visual inspection) for each fluid tested.

TABLE 1

| Sample No. | Fluid Composition | Temperature (° F.) | Crossover Frequency (rad/s) | FIG. |
|---|---|---|---|---|
| 3 | 45 pptg WG-35 ™[a] in 2% KCl solution in tap water | 77° F. | 10 | 4 |
| 4 | 5% cationic viscoelastic surfactant in simulated spent 20% HCl (18% $CaCl_2$ and 18% $MgCl_2$) (pH = 4) | 75° F. | 0.12 | 4 |
| 5 | 5% amphoteric viscoelastic surfactant in simulated spent 20% HCl (18% $CaCl_2$ and 18% $MgCl_2$); pH = 4 | 75° F. | 0.15 | 4 |
| 6 | 5% (by volume) Miraitane BET-O 30 ™[b] 0.15% (by volume) oleic acid 1.5% (by volume) MO-67 ™[c] in 2% KCl solution in tap water | 100° F. | 0.02 | 4 |
| 7 | 70 pptg BARAZAN ®-D in 1% NaCl solution in tap water (pH = 6.67) | 100° F. | <0.01 | 4 |
| 8 | 5% cationic viscoelastic surfactant in simulated spent 20% HCl (18% $CaCl_2$ and 18% $MgCl_2$) (pH = 4) | 160° F. | >10 | 5 |
| 9 | 5% (by volume) Miraitane BET-O 30 ™ 0.15% (by volume) oleic acid 1.5% (by volume) MO-67 ™ in 2% KCl solution in tap water | 150° F. | 1 | 5 |
| 10 | 70 pptg BARAZAN ®-D in 1% NaCl solution in tap water (pH = 6.67) | 150° F. | <0.01 | 5 |

[a]A guar gelling agent available from Halliburton Energy Services, Inc., Duncan, Oklahoma.
[b]An oleamidopropyl betaine surfactant available from Rhodia Inc., Cranbury, New Jersey.
[c]An oil gelling agent available from Halliburton Energy Services, Inc., Duncan, Oklahoma.

Example 2

Figure 6:
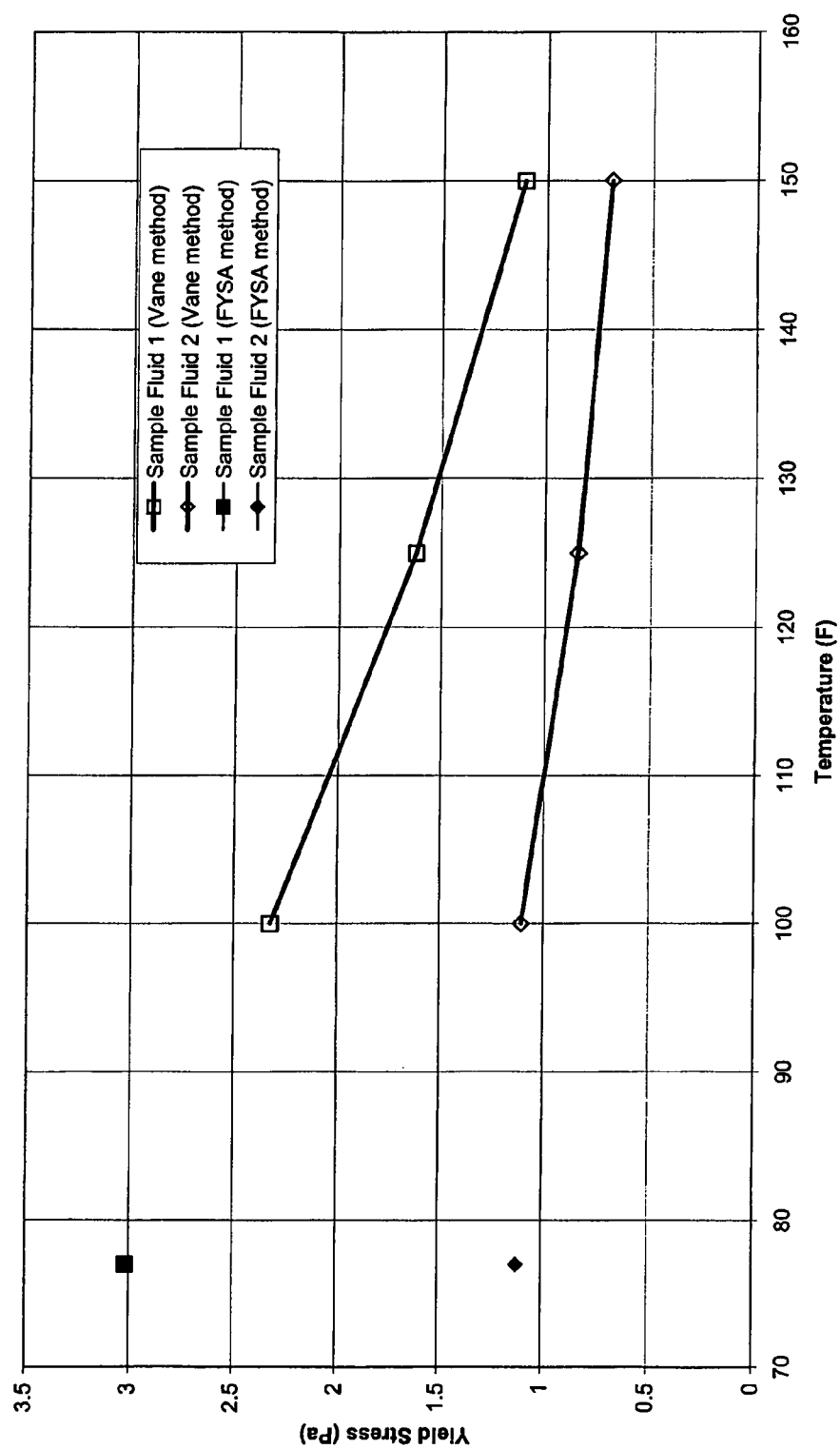
FIG. 6 illustrates data regarding certain properties of various treatment fluids, some of which represent embodiments of the treatment fluids of the present invention.

Sample Fluids 1 and 2 as described in Example 1 above also were tested to determine the yield stress of each sample fluid. Data for cessation of steady shear flow was obtained over approximately a 10-minute period for each sample fluid with each of (1) a Brookfield DV-II+ rheometer (available from Brookfield Engineering Laboratories, Inc., Middleboro, Mass.) fitted with a 6-bladed vane with a height to diameter ratio of 2, and (2) a Fann® 35 viscometer (available from Fann Instrument Company, Houston, Tex.) fitted with an F0.2 (1/5) spring and a Fann Yield Stress Adapter (FYSA) (available from Halliburton Energy Services, Inc., Duncan, Okla.). Measurements were taken at temperatures of 100° F., 125° F., and 150° F. with the Brookfield DV-II+ rheometer and at 77° F. with the FYSA. The 3-mode modified Maxwell model shown in the equation below was used to define stress relaxation curves for each of the sample fluids:

$$\tau = \left[\sum_{i=1}^{n} \eta_i e^{-t/\lambda_i}\right] \dot{\gamma}_0 + \tau_0$$

wherein $\tau$ is shear stress at time=t, $\tau_0$ to is yield stress, $\eta_i$ is the steady shear viscosity for mode i, $\dot{\gamma}_0$ is steady-state shear rate at all times before cessation of steady shear flow, $\lambda_i$ is the relaxation time of the fluid for mode i, and n is an integer representing the number of modes. This equation was then fit to the cessation data obtained with the Brookfield DV-II+ rheometer. The yield stresses determined with this equation as well as those measured with the FYSA apparatus for each of the sample fluids are listed in Table 2 below, and are plotted versus temperature in FIG. 6.

TABLE 2

| | Yield stresses (Pa) | |
|---|---|---|
| Temperature (° F.) | Sample Fluid 1 | Sample Fluid 2 |
| 77° F. | 3.02 | 1.12 |
| 100° F. | 2.33 | 1.10 |
| 125° F. | 1.62 | 0.84 |
| 150° F. | 1.10 | 0.69 |

As shown, the yield stresses of Sample Fluid 1 are above those of Sample Fluid 2 throughout the period. The higher yield stress ($\tau_0$) values for Sample Fluid 1 of the present invention will decrease the value of the left-hand side of the following inequality, $$\frac{(\rho_p - \rho_f)g_c R}{\tau_0} < 7,$$

thereby allowing Sample Fluid 1 to satisfy that inequality for certain particulate materials whereas other fluids may not.

Thus, Example 2 illustrates that certain fluids of the present invention may exhibit increased particulate transport capabilities.

Example 3

Figure 7:
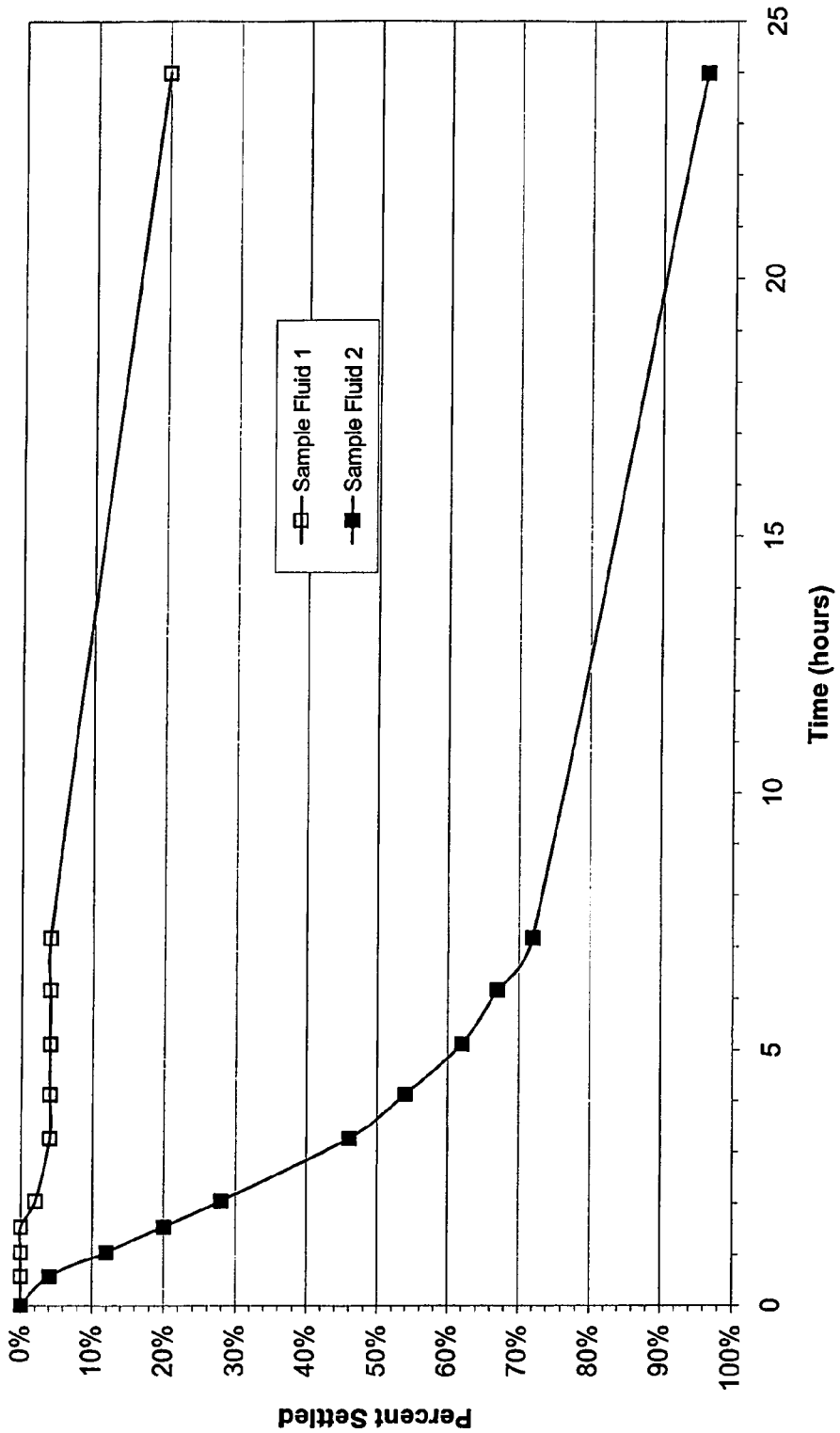
FIG. 7 illustrates data regarding certain properties of various treatment fluids, some of which represent embodiments of the treatment fluids of the present invention.

Sample Fluids 1 and 2 prepared as described above also were tested by visually inspecting their particulate suspension capabilities. Each of the two sample fluids were heated to 150° F. and mixed with 9 pounds per gallon (ppg) of 30/50 ECONOPROP® particulate material in each of 2-50 mL graduated cylinders having diameters of approximately 0.8 inches (preheated to 150° F.) to form uniform slurries. 50 mL of each of the slurries were then placed in separate 50 mL graduated cylinders. The samples were inspected periodically over the next 24 hours to determine the amount of particulate settling over time in each sample. The millimeter mark at the top of the settled particulate pack was recorded at various points over the course of the 24 hours, and a "percent settled" was calculated for each by taking the difference between the initial state (a homogenously suspended slurry with the top of the particulate pack at the top of the fluid at 50 mL) and the state at that time, and dividing that difference by the millimeter mark of a completely settled particulate pack (in this case, the 25 mL mark). Table 3 below displays this data in tabular form, and FIG. 7 shows a plot of the "percent settled" data versus time.

TABLE 3

| | Sample Fluid 1 | | Sample Fluid 2 | |
|---|---|---|---|---|
| Time (hours) | Millimeter Mark | Percent Settled | Millimeter Mark | Percent Settled |
| 0 | 50 | 0% | 51 | 0% |
| 0.58 | 50 | 0% | 50 | 4% |
| 1.05 | 50 | 0% | 48 | 12% |
| 1.56 | 50 | 0% | 46 | 20% |
| 2.05 | 49.5 | 2% | 44 | 28% |
| 3.27 | 49 | 4% | 39.5 | 46% |
| 4.13 | 49 | 4% | 37.5 | 54% |
| 5.12 | 49 | 4% | 35.5 | 62% |
| 6.17 | 49 | 4% | 34.25 | 67% |
| 7.17 | 49 | 4% | 33 | 72% |
| 24 | 45 | 20% | 27 | 96% |

Thus, Example 3 illustrates that certain fluids of the present invention may exhibit enhanced particulate transport and suspension capabilities.

Example 4

Each of the two sample fluids described in Example 1 above was mixed with 9 pounds per gallon (ppg) of 30/50 mesh ECONOPROP® particulate material (available from CARBO Ceramics, Inc., Irving, Tex.) to form uniform slurries. The slurries were each placed in the cup of a device known as a MIMIC™ proppant transport measuring system (available from Halliburton Energy Services, Inc.). The MIMIC™ device used was similar to the device described in FIG. 2 of U.S. Pat. No. 6,782,735, except that the design of the cup was modified as shown in FIG. 8 of this specification.

Figure 9:
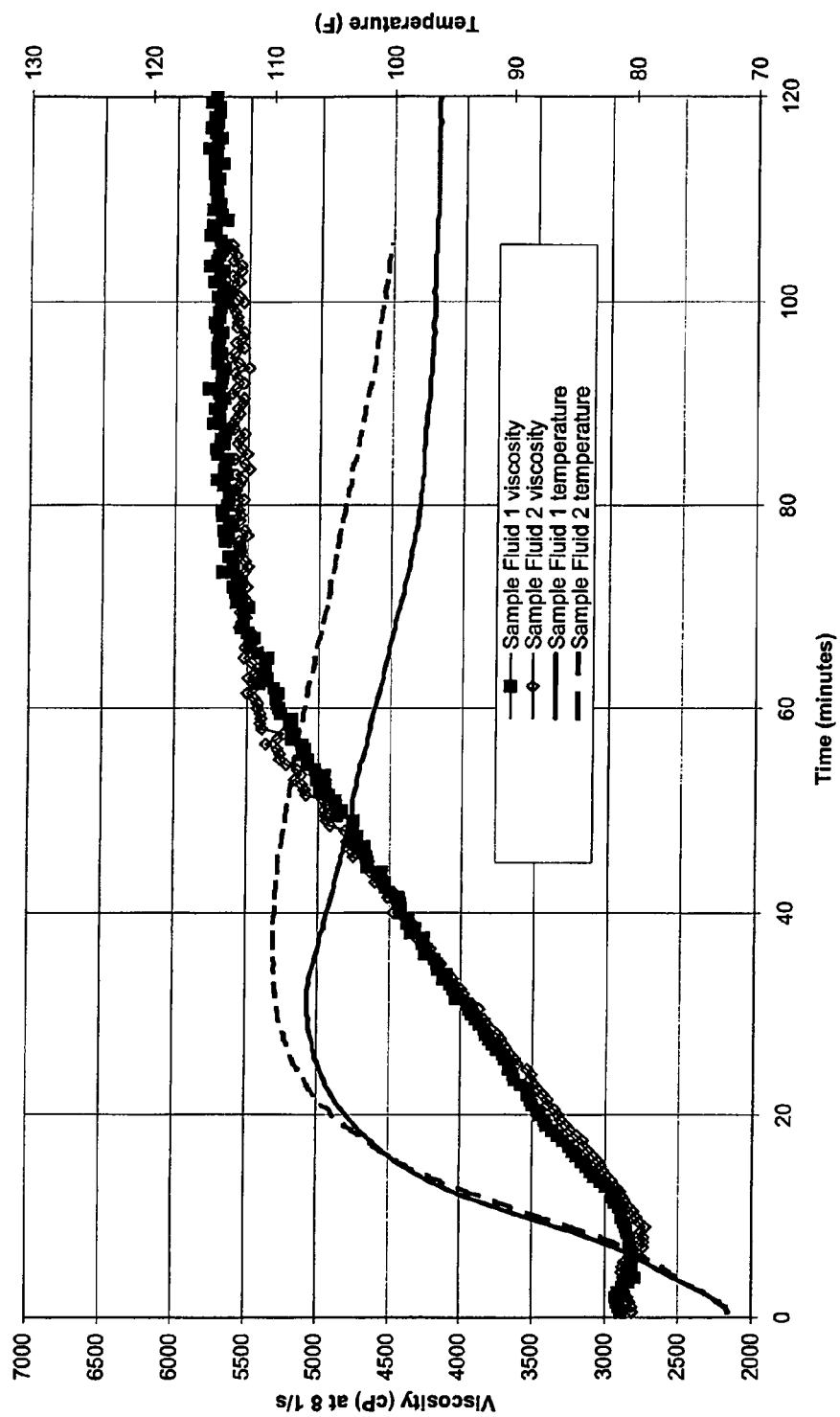
FIG. 9 illustrates data regarding certain properties of various treatment fluids, some of which represent embodiments of the treatment fluids of the present invention.
Figure 10:
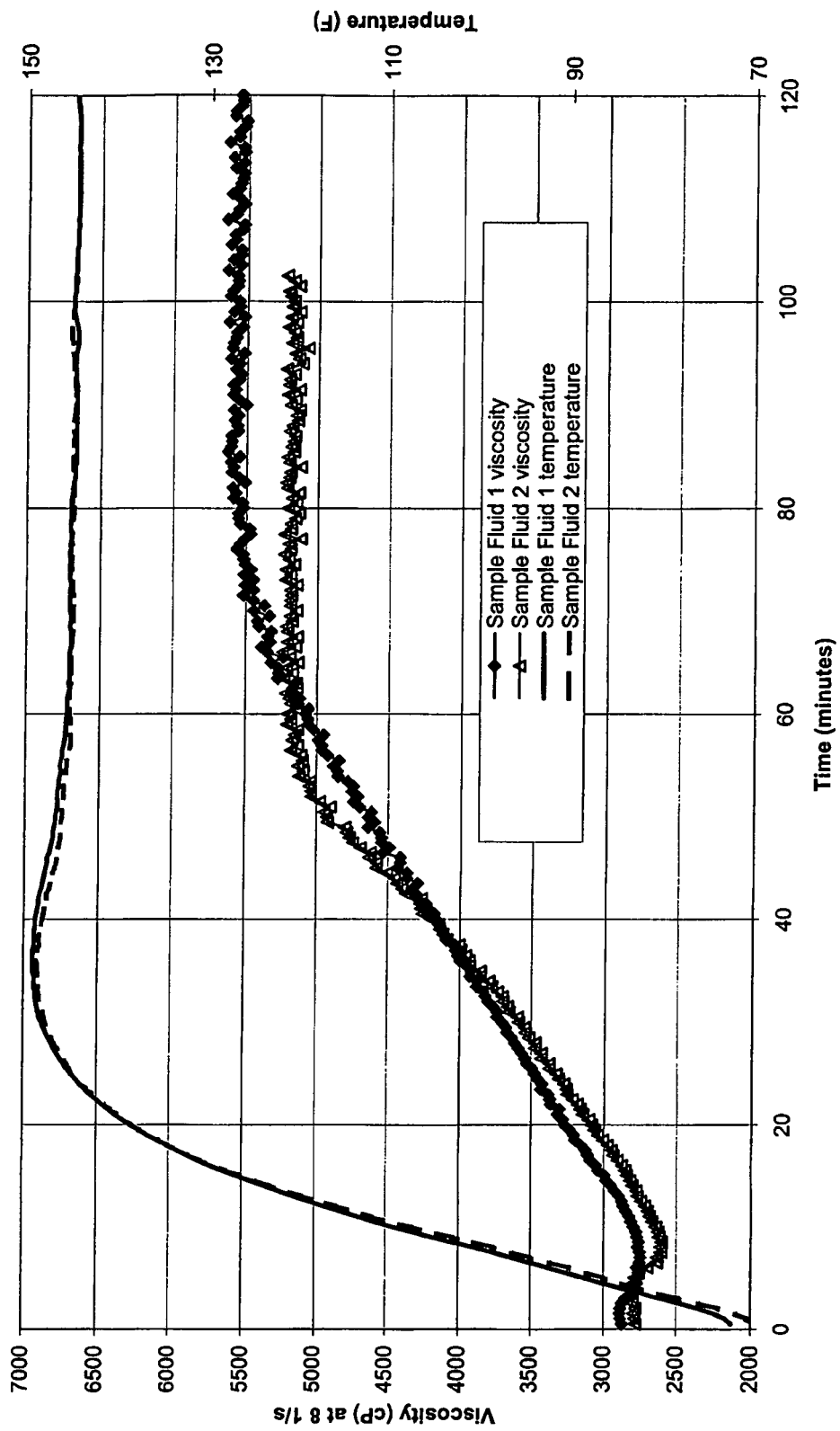
FIG. 10 illustrates data regarding certain properties of various treatment fluids, some of which represent embodiments of the treatment fluids of the present invention.
Figure 11:
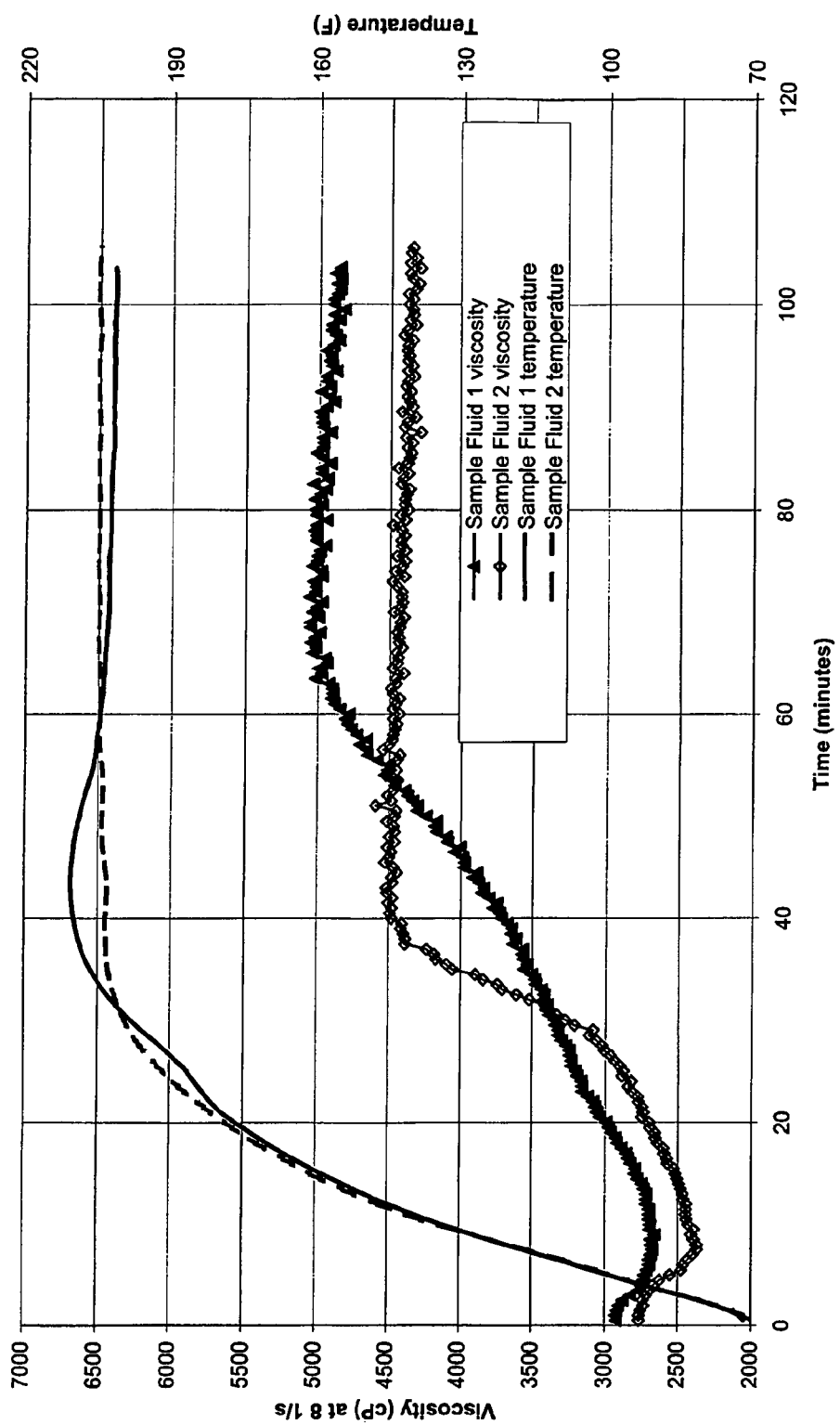
FIG. 11 illustrates data regarding certain properties of various treatment fluids, some of which represent embodiments of the treatment fluids of the present invention.
Figure 12:
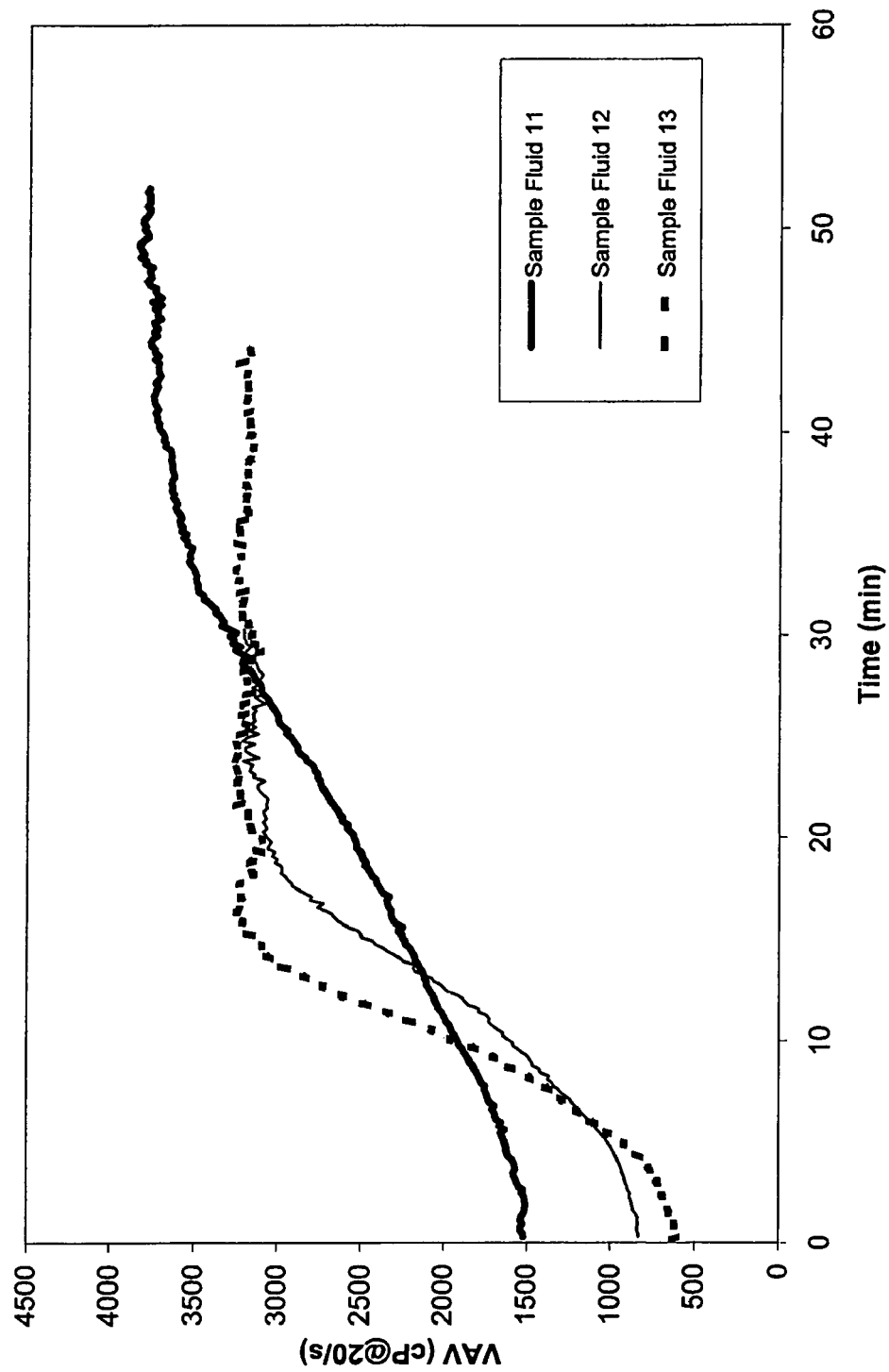
FIG. 12 illustrates data regarding certain properties of various treatment fluids, some of which represent embodiments of the treatment fluids of the present invention.
Figure 13:
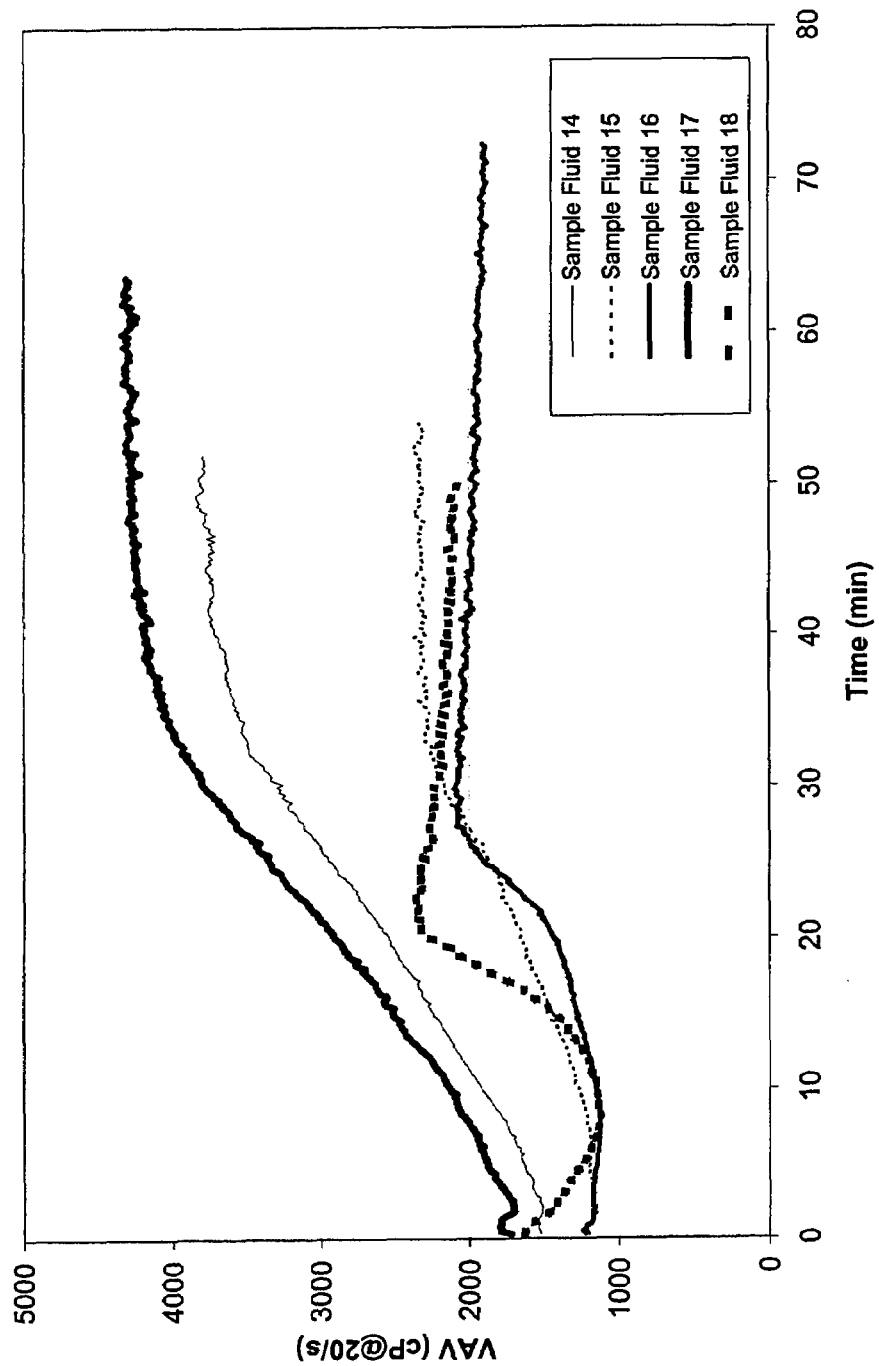
FIG. 13 illustrates data regarding certain properties of various treatment fluids, some of which represent embodiments of the treatment fluids of the present invention.
Figure 14:
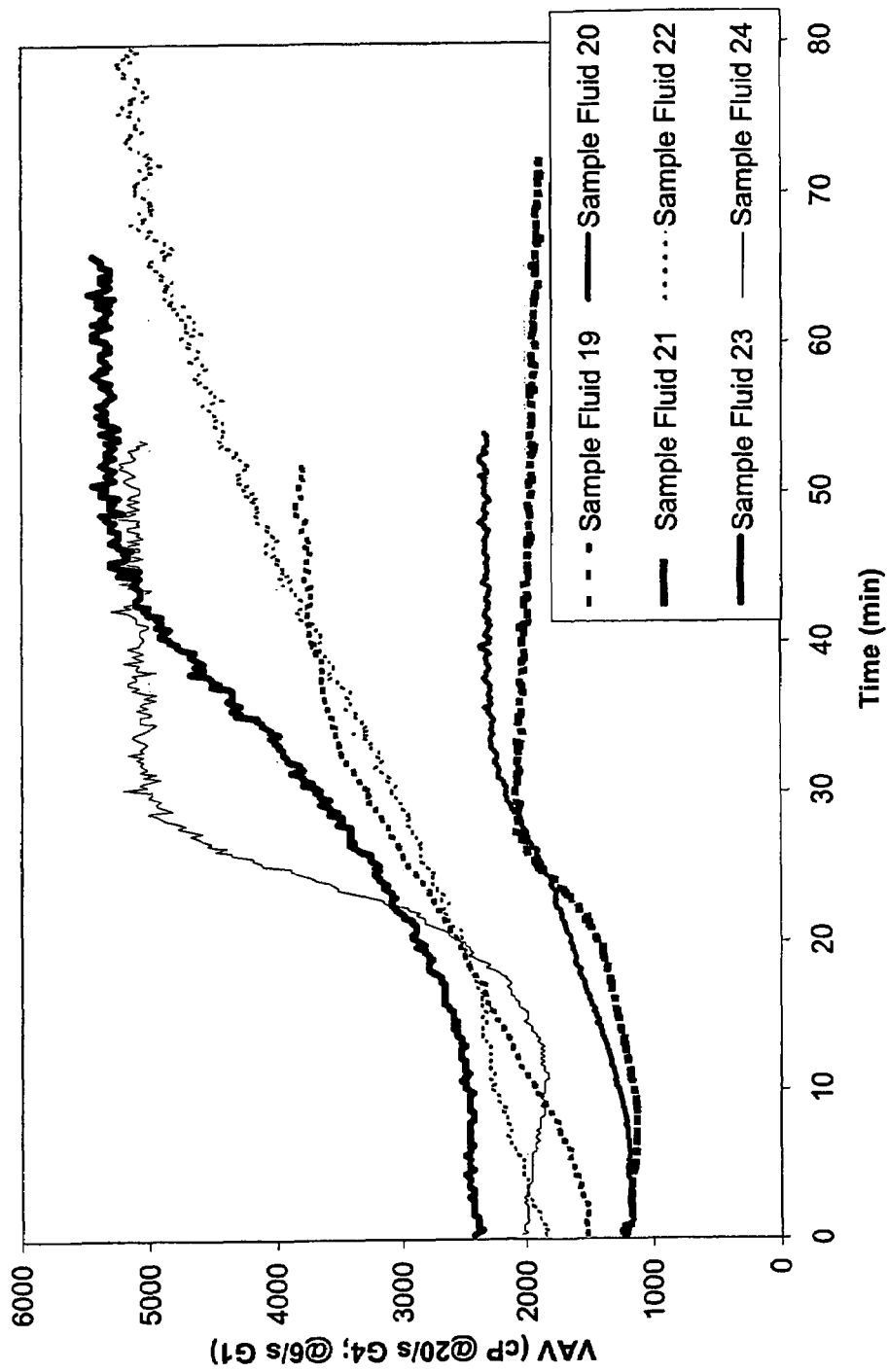
FIG. 14 illustrates data regarding certain properties of various treatment fluids, some of which represent embodiments of the treatment fluids of the present invention.
Figure 15:
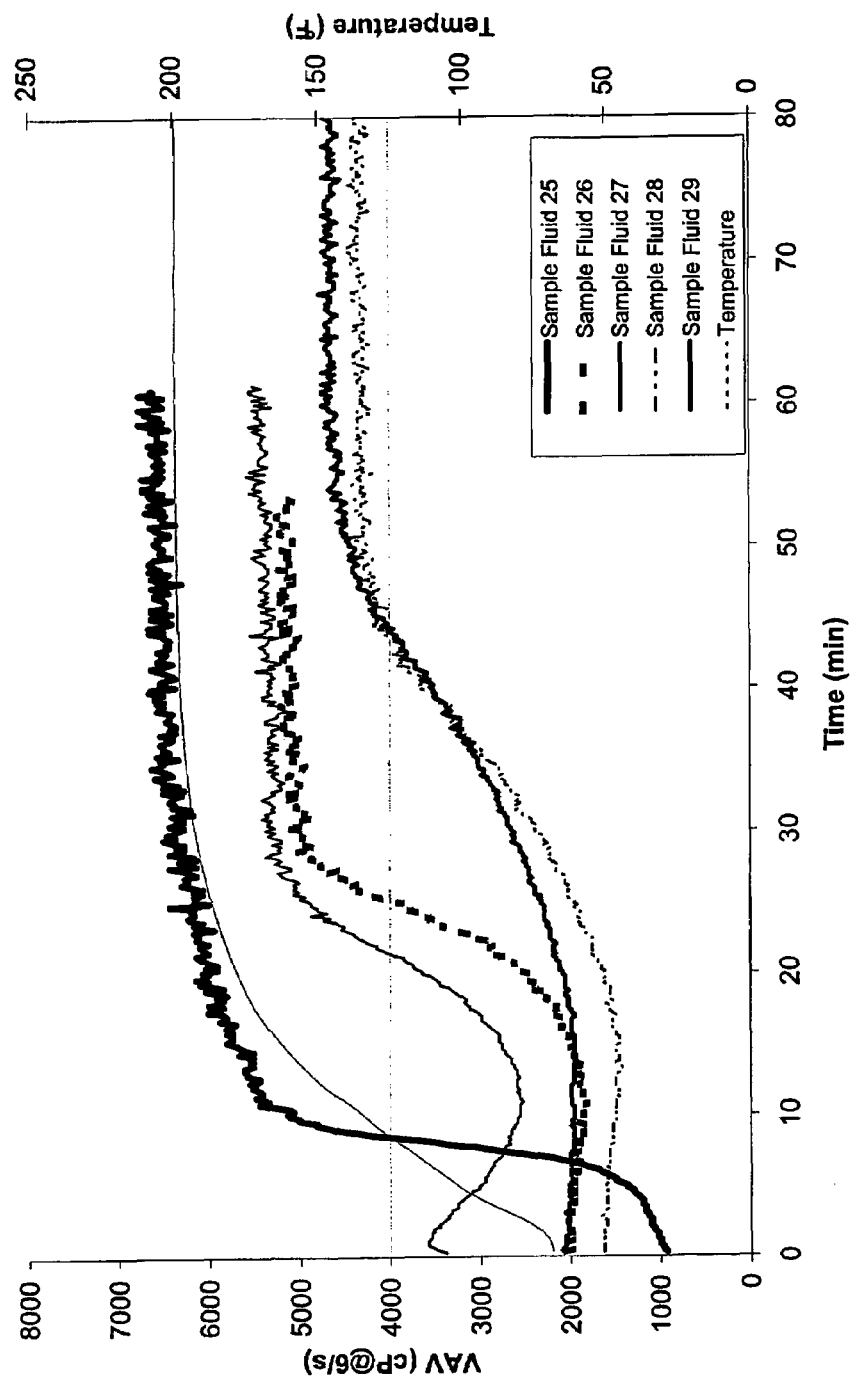
FIG. 15 illustrates data regarding certain properties of various treatment fluids, some of which represent embodiments of the treatment fluids of the present invention.
Figure 16:
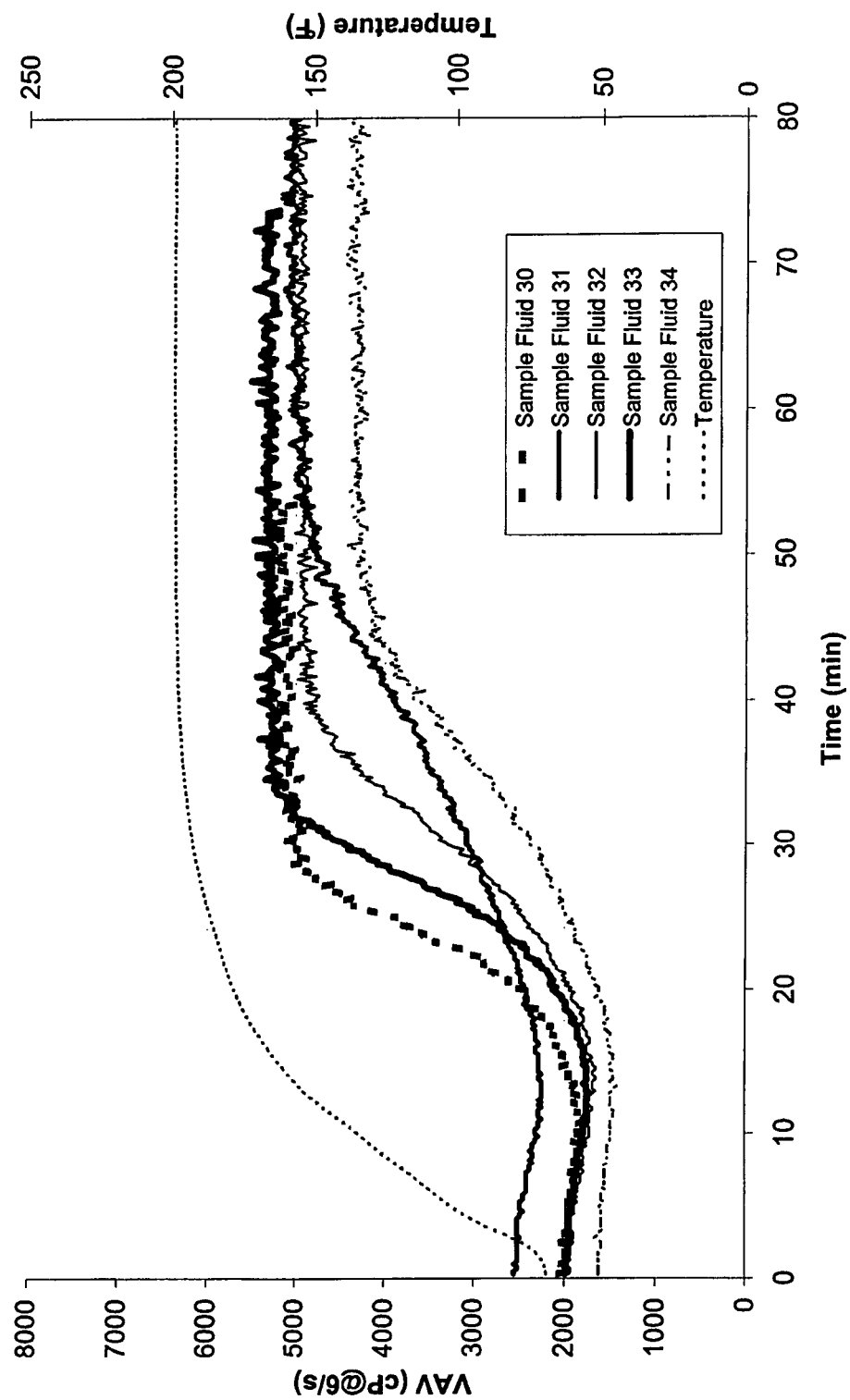
FIG. 16 illustrates data regarding certain properties of various treatment fluids, some of which represent embodiments of the treatment fluids of the present invention.
Figure 17:
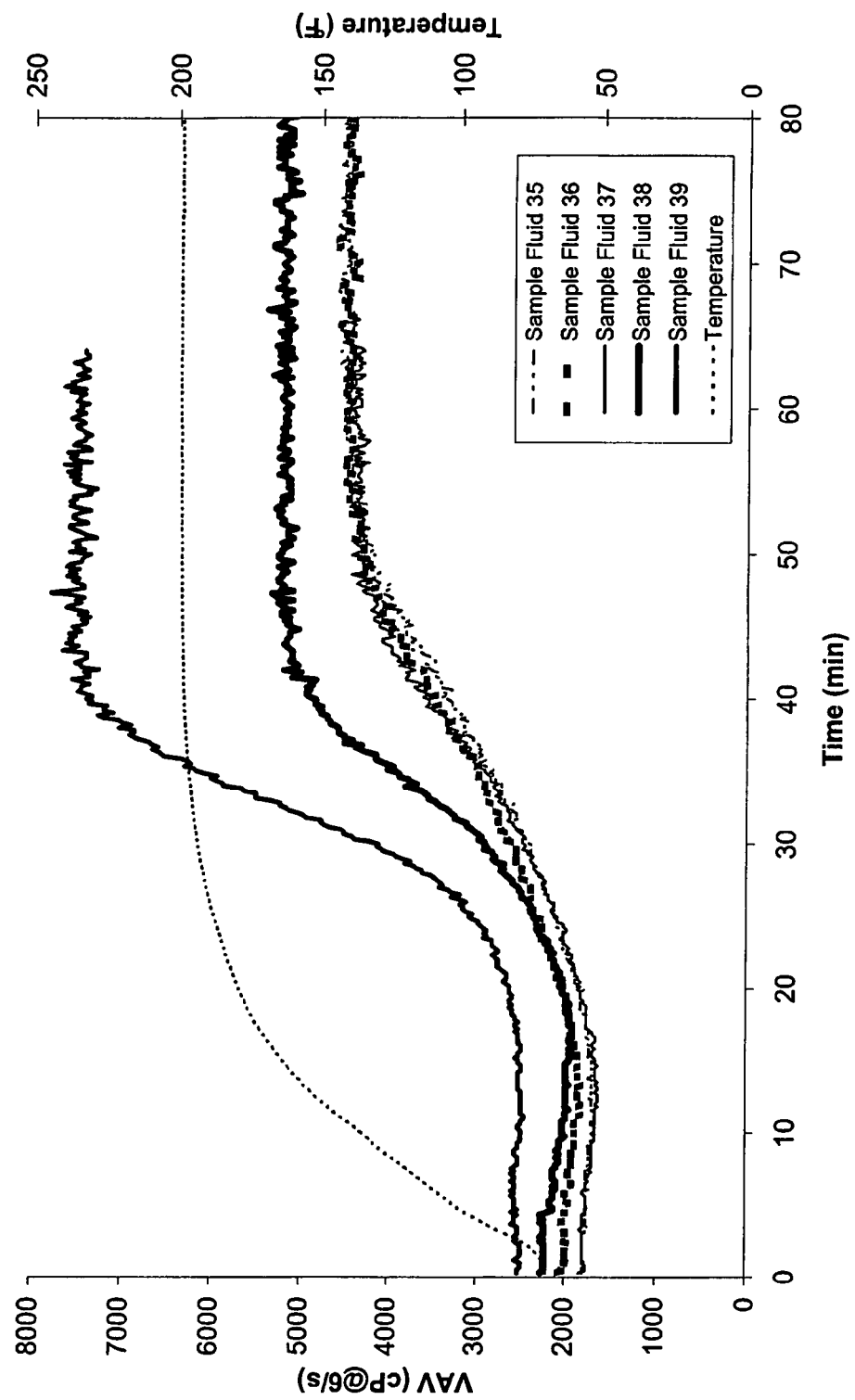
FIG. 17 illustrates data regarding certain properties of various treatment fluids, some of which represent embodiments of the treatment fluids of the present invention.
Figure 18:
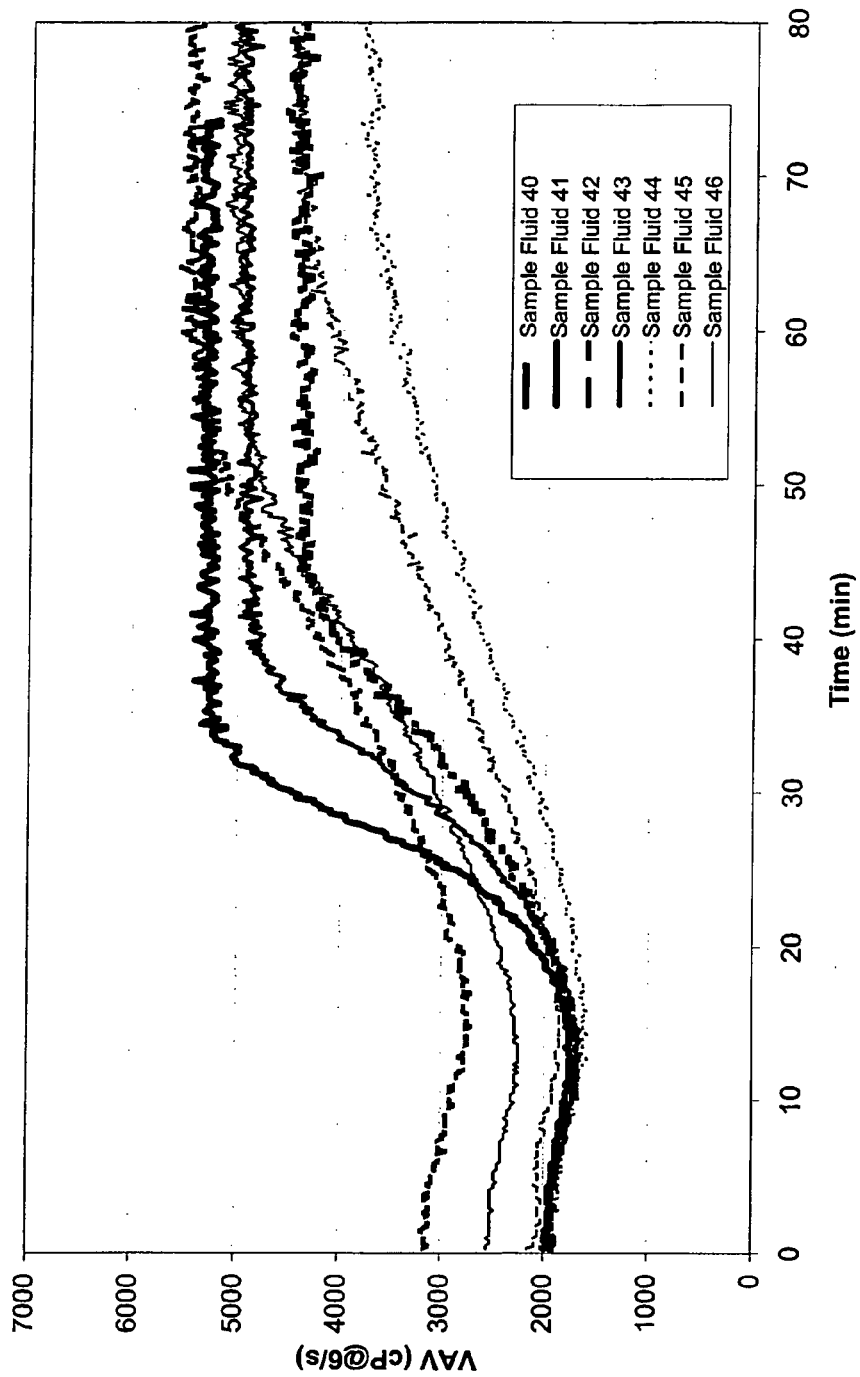
FIG. 18 illustrates data regarding certain properties of various treatment fluids, some of which represent embodiments of the treatment fluids of the present invention.
Figure 19:
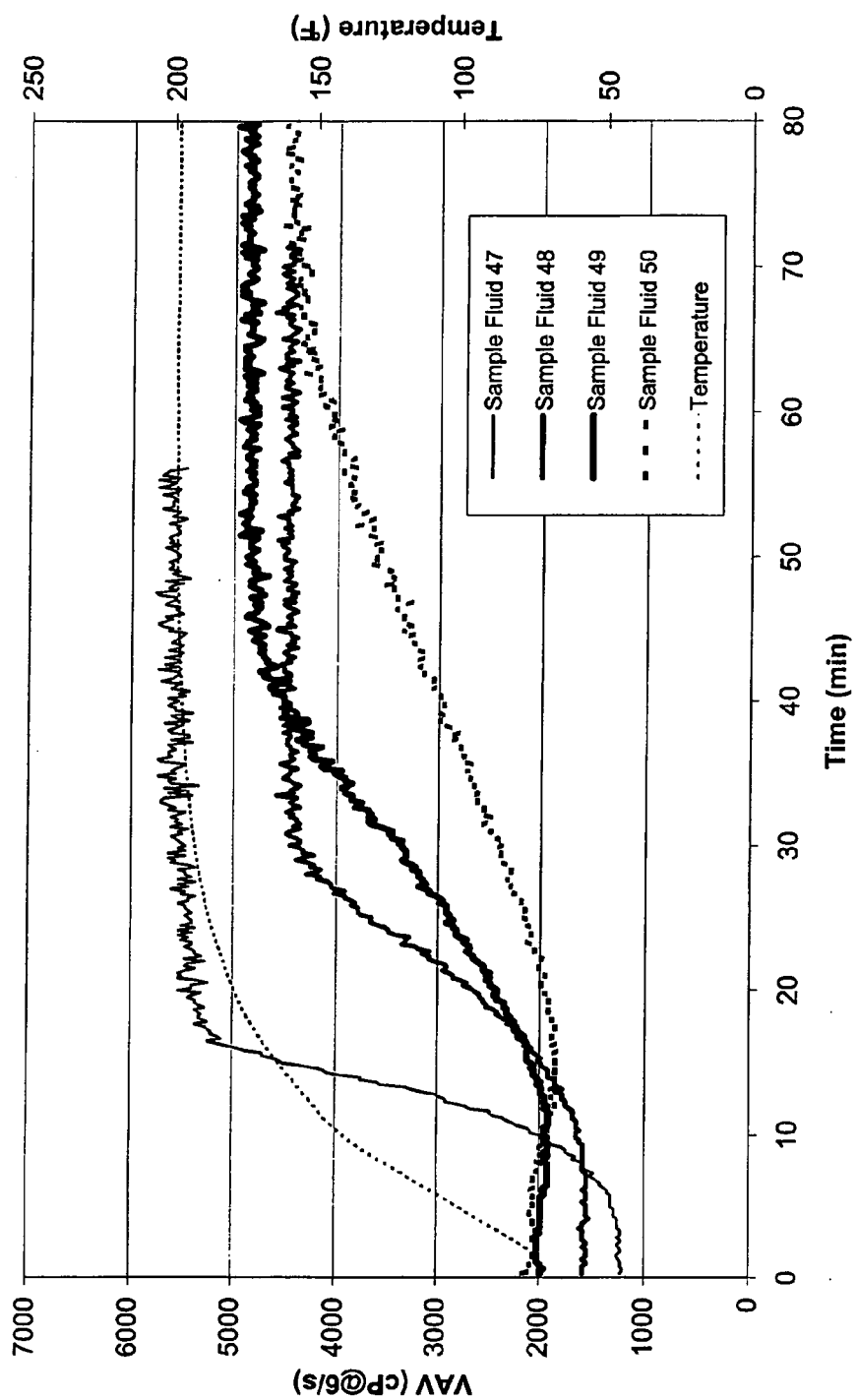
FIG. 19 illustrates data regarding certain properties of various treatment fluids, some of which represent embodiments of the treatment fluids of the present invention.
Figure 20:
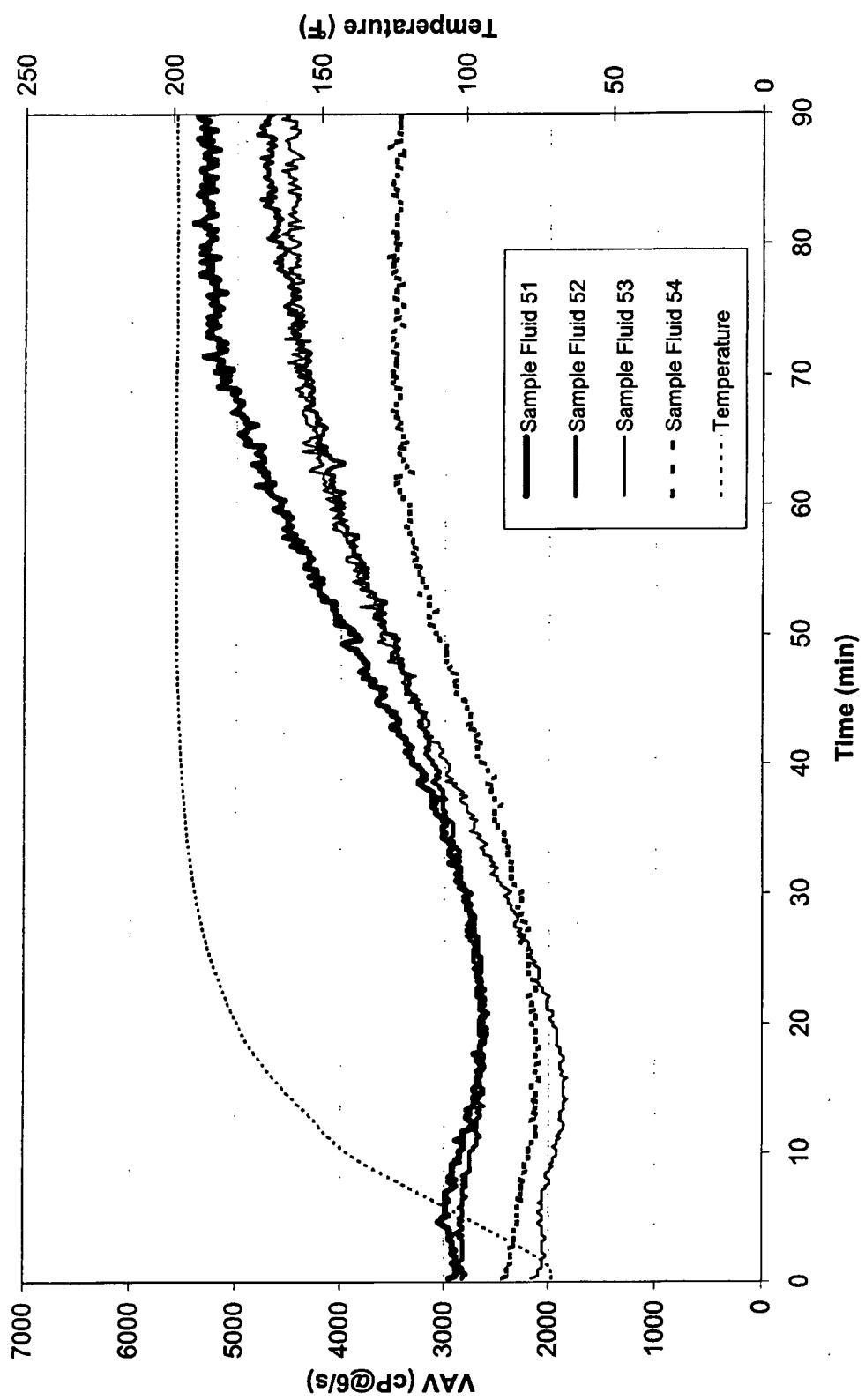
FIG. 20 illustrates data regarding certain properties of various treatment fluids, some of which represent embodiments of the treatment fluids of the present invention.
Figure 21:
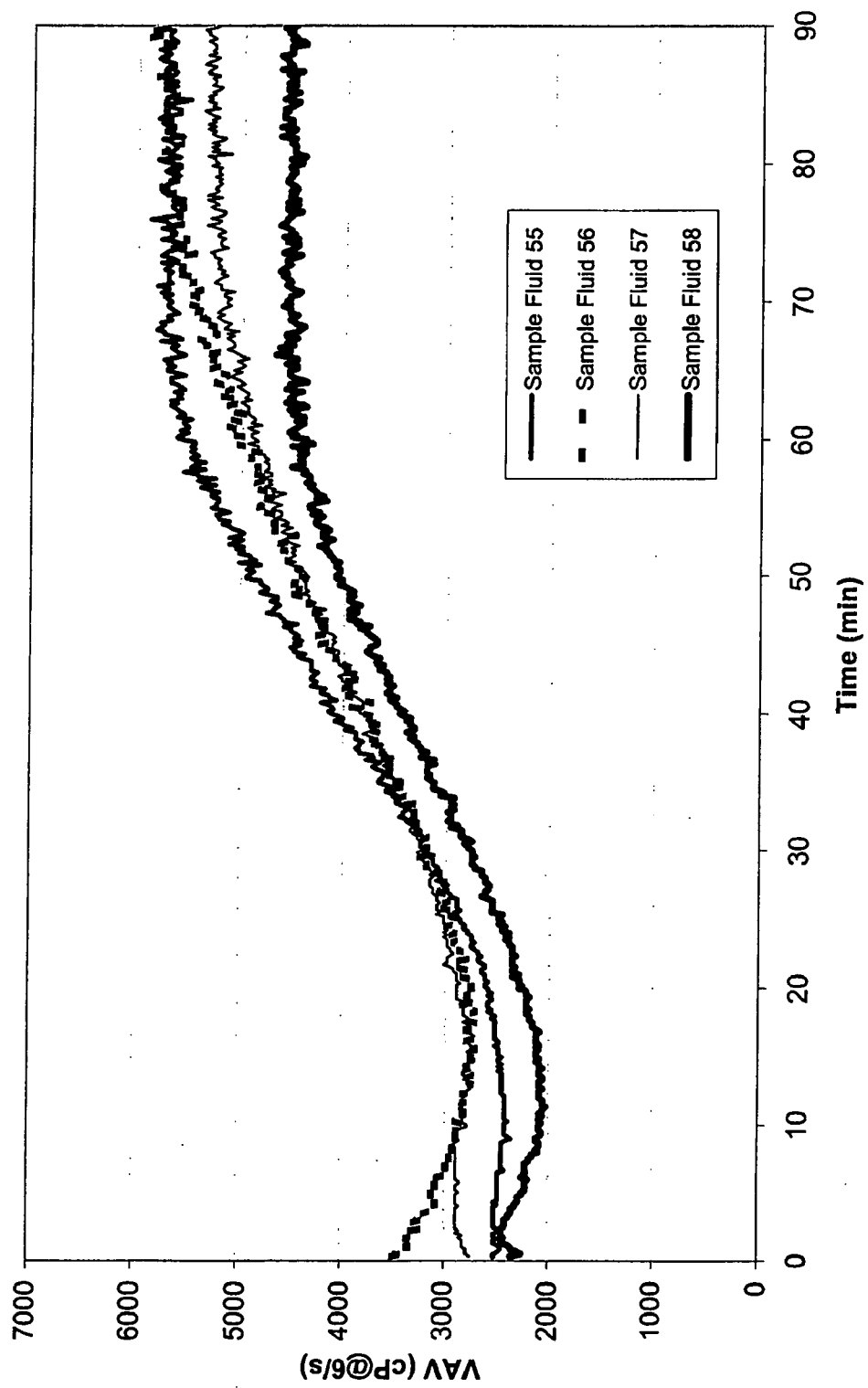
FIG. 21 illustrates data regarding certain properties of various treatment fluids, some of which represent embodiments of the treatment fluids of the present invention.

At three different test temperatures (100° F., 150° F., and 200° F.), the temperature was increased to its final test temperature and volume-averaged viscosity data was collected over a 120-minute period on the MIMIC™ device using a volume-averaged shear rate of 8 s$^{-1}$. Plots of the volume-averaged viscosity of each sample fluid during each of these tests are shown in FIGS. 9, 10, and 11. Once the volume-averaged viscosity of a sample fluid stopped increasing and maintained a fairly constant value, the particulate slurry was considered settled. At 100° F. (FIG. 9), Sample Fluid 1 settled in about 68 minutes, whereas Sample Fluid 2 settled in about 59 minutes. At 150° F. (FIG. 10), Sample Fluid 1 settled in about 70 minutes, whereas Sample Fluid 2 settled in about 55 minutes. At 200° F (FIG. 11), Sample Fluid 1 settled in about 62 minutes, whereas Sample Fluid 2 settled in about 39 minutes.

The settling times for several additional fluid samples (Sample Fluids 11-59) gelled with linear gelling agents were measured with MIMIC™ devices at various different conditions (e.g., pH, temperature, etc.). Each sample fluid was made with a solution of 1% by weight sodium chloride in tap water (except where noted) in addition to the components listed for each sample fluid in Table 4 below, and was mixed with 9 pounds per gallon (ppg) of 30/50 mesh ECONOPROP® particulate material (available from CARBO Ceramics, Inc., Irving, Tex.) to form a uniform slurry. The compositions of the sample fluids and the conditions at which they were tested are listed in Table 4 below. The sample cups in the MIMIC devices used were either of the configuration described in U.S. Pat. No. 6,782,735 ("standard" configuration), or the configuration shown in FIG. 8 ("modified" configuration), as indicated in Table 4 below. FIGS. 12-21, as listed in Table 3 below, show the results of these tests.

TABLE 4

| Sample Fluid No. | Fluid Composition | MIMIC™ Test Cup Configuration | pH | Temperature (° F.) | FIG. |
|---|---|---|---|---|---|
| 11 | 70 pptg WG-37 ™ | Modified | — | 75 | 12 |
| 12 | 50 pptg WG-37 ™ | Modified | — | 75 | 12 |
| 13 | 40 pptg WG-37 ™ | Modified | — | 75 | 12 |
| 14 | 70 pptg WG-37 ™ | Modified | — | 75 | 13 |
| 15 | 70 pptg WG-37 ™ | Modified | — | 150 | 13 |
| 16 | 70 pptg WG-37 ™ | Modified | — | 200 | 13 |
| 17 | 70 pptg WG-18 ™$^d$ | Modified | — | 75 | 13 |
| 18 | 70 pptg WG-18 ™ | Modified | — | 200 | 13 |
| 19 | 70 pptg WG-37 ™ | Modified$^i$ | — | 75 | 14 |
| 20 | 70 pptg WG-37 ™ | Modified$^i$ | — | 150 | 14 |
| 21 | 70 pptg WG-37 ™ | Modified$^i$ | — | 200 | 14 |
| 22 | 70 pptg WG-37 ™ | Standard$^h$ | — | 75 | 14 |
| 23 | 70 pptg WG-37 ™ | Standard$^h$ | — | 150 | 14 |
| 24 | 70 pptg WG-37 ™ | Standard$^h$ | — | 200 | 14 |
| 25 | 40 pptg WG-37 ™ | Standard | 7 | 200 | 15 |
| 26 | 70 pptg WG-37 ™ | Standard | 7 | 200 | 15 |
| 27 | 70 pptg WG-36 ™$^e$ | Standard | 7 | 200 | 15 |
| 28 | 70 pptg WG-24 ™$^f$ | Standard | 7 | 200 | 15 |
| 29 | 70 pptg WG-24 ™ (10% NaCl) | Standard | 7 | 200 | 15 |
| 30 | 70 pptg WG-37 ™ | Standard | 7 | 200 | 16 |
| 31 | 70 pptg BARAZAN ®-D (ADM)* | Standard | 7 | 200 | 16 |
| 32 | 70 pptg BARAZAN ®-D-PLUS | Standard | 7 | 200 | 16 |
| 33 | 70 pptg BARAZAN ® | Standard | 7 | 200 | 16 |
| 34 | 70 pptg WG-24 ™ | Standard | 7 | 200 | 16 |
| 35 | 70 pptg WG-24 ™ | Standard | 7 | 200 | 17 |
| 36 | 70 pptg WG-24 ™ + Fe-2 ™$^g$ | Standard | 7 | 200 | 17 |
| 37 | 70 pptg WG-24 ™ | Standard | 3.5 | 200 | 17 |
| 38 | 70 pptg WG-24 ™ | Standard | 9 | 200 | 17 |
| 39 | 70 pptg WG-24 ™ | Standard | 9.5 | 200 | 17 |
| 40 | 70 pptg BARAZAN ® | Standard | 3.5 | 200 | 18 |
| 41 | 70 pptg BARAZAN ® | Standard | 9.5 | 200 | 18 |
| 42 | 70 pptg BARAZAN ®-D-PLUS | Standard | 3.5 | 200 | 18 |
| 43 | 70 pptg BARAZAN ®-D-PLUS | Standard | 9.5 | 200 | 18 |

TABLE 4-continued

| Sample Fluid No. | Fluid Composition | MIMIC ™ Test Cup Configuration | pH | Temperature (° F.) | FIG. |
|---|---|---|---|---|---|
| 44 | 70 pptg BARAZAN ®-D (ADM)* | Standard | 3.5 | 200 | 18 |
| 45 | 70 pptg BARAZAN ®-D (ADM)* | Standard | 7.3 | 200 | 18 |
| 46 | 70 pptg BARAZAN ®-D (ADM)* | Standard | 9.5 | 200 | 18 |
| 47 | 40 pptg BARAZAN ®-D (ADM)* | Standard | 7.2 | 200 | 19 |
| 48 | 50 pptg BARAZAN ®-D (ADM)* | Standard | 7.3 | 200 | 19 |
| 49 | 60 pptg BARAZAN ®-D (ADM)* | Standard | 7.2 | 200 | 19 |
| 50 | 70 pptg BARAZAN ®-D (ADM)* | Standard | 7.3 | 200 | 19 |
| 51 | 70 pptg BARAZAN ®-D (Cargill)* | Standard | 3.5 | 200 | 20 |
| 52 | 70 pptg BARAZAN ®-D (Cargill)* | Standard | 6.4 | 200 | 20 |
| 53 | 70 pptg BARAZAN ®-D (Cargill)* | Standard | 7.3 | 200 | 20 |
| 54 | 70 pptg BARAZAN ®-D (Cargill)* | Standard | 8.0 | 200 | 20 |
| 55 | 70 pptg BARAZAN ®-D (ADM)* | Standard | 7.3 | 200 | 21 |
| 56 | 70 pptg BARAZAN ®-D (ADM)* in unfiltered water | Standard | 7.5 | 200 | 21 |
| 57 | 70 pptg BARAZAN ®-D (ADM)* in charcoal filtered water | Standard | 7.9 | 200 | 21 |
| 58 | 70 pptg BARAZAN ®-D (ADM)* in filtered water | Standard | 7.5 | 200 | 21 |

*The BARAZAN ®-D polymers tested were obtained from two different manufacturers (ADM and Dow Cargill) as indicated.
$^d$A carboxymethylhydroxypropyl guar (CMHPG) available from Halliburton Energy Services, Inc., Duncan, Oklahoma.
$^e$A guar gelling agent available from Halliburton Energy Services, Inc., Duncan, Oklahoma.
$^f$A xanthan gelling agent available from Halliburton Energy Services, Inc., Duncan, Oklahoma.
$^g$A citric acid additive available from Halliburton Energy Services, Inc., Duncan, Oklahoma.
$^h$Designated as "G1" in FIG. 14.
$^i$Designated as "G4" in FIG. 14.

As these data indicate, the concentration of the particulate transport enhancing additive(s), the source of the particulate transport enhancing additive(s), the pH of the fluid, the temperature of the fluid, conditioning of the base fluid, and other factors may affect the particulate transport and suspension capabilities of the fluids of the present invention.

Comparative Example

Figure 22:
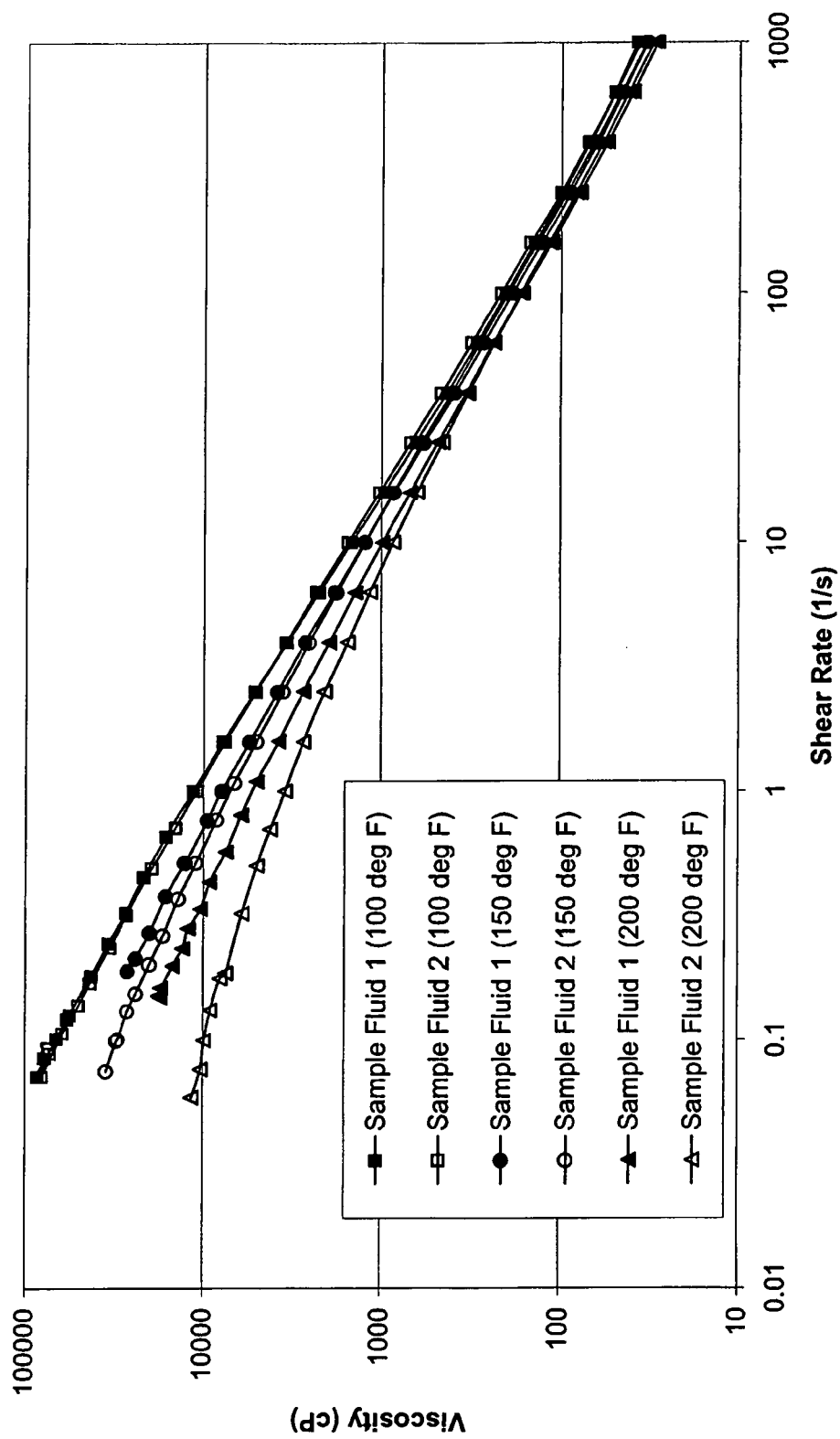
FIG. 22 illustrates data regarding certain properties of various treatment fluids, some of which represent embodiments of the treatment fluids of the present invention.

For comparison with the testing detailed above, the viscosities of Sample Fluids 1 and 2 described in Example 1 above were measured at 100° F., 150° F, and 200° F. using a steady shear flow test using a StressTech rheometer (available from Reologica Instruments, Inc., Bordentown, N.J.) with a Sealed Cell Cup and Bob. The results of these tests are shown in FIG. 22. As shown, for each temperature, the viscosities of the two sample fluids were approximately equal at shear rates from about 5 to about 500 s$^{-1}$.

Thus, the comparative example above illustrates that the present invention may enhance the ability to predict and apply proppant transport capabilities of a fluid, as compared to conventional steady shear testing.

Example 5

Sample Fluids 59, 60, and 61 of the present invention was prepared by mixing 52.5 pptg of a depyruvated xanthan gelling agent and 17.5 pptg of WG-35™ (guar gelling agent available from Halliburton Energy Services, Inc., Duncan, Okla.) in a solution of 1% by weight sodium chloride in tap water. The pH levels of Sample Fluids 59, 60, and 61 were adjusted to 3.5, 6.7, and 8.7, respectively. Sample Fluid 62 of the present invention was prepared by mixing 70 pptg BARAZAN D® in a solution of 1% by weight sodium chloride in tap water (pH=7.3). Each of the two sample fluids were mixed with 9 pounds per gallon (ppg) of 30/50 ECONOPROP® particulate material (available from CARBO Ceramics, Inc., Irving, Tex.) to form uniform slurries. The slurries were each placed in the cup of a device known as a MIMIC™ proppant transport measuring system (available from Halliburton Energy Services, Inc.). The MIMIC™ device used was similar to the device described in FIG. 2 of U.S. Pat. No. 6,782,735, except that the design of the cup was modified as shown in FIG. 8 of this specification.

Figure 23:
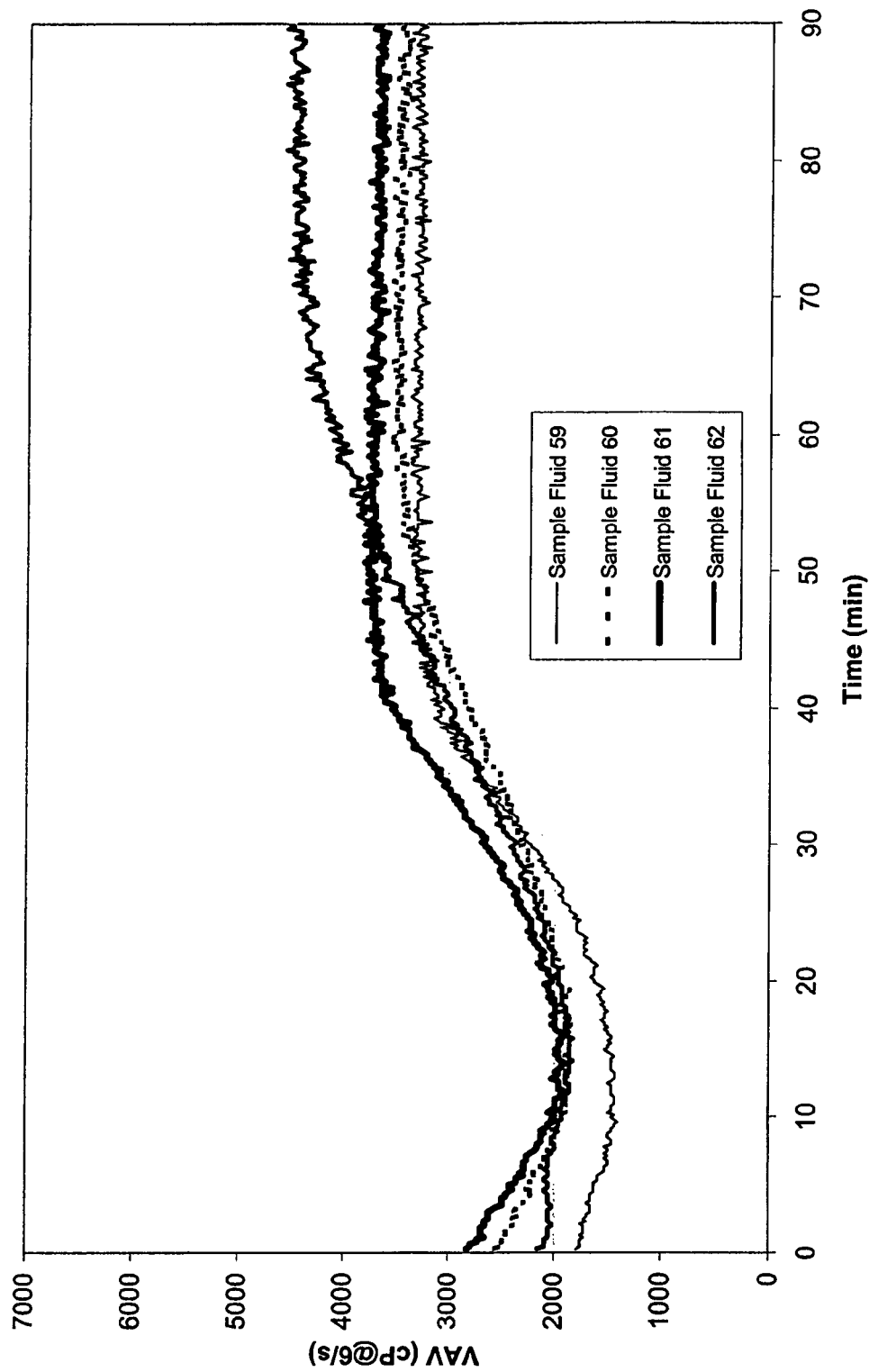
FIG. 23 illustrates data regarding certain properties of various treatment fluids, some of which represent embodiments of the treatment fluids of the present invention.

The temperature was increased to 200° F. and volume-averaged viscosity data was collected over a 120-minute period on the MIMIC™ device using a volume-averaged shear rate of 8 s$^{-1}$. A plot of the volume-averaged viscosity of each sample fluid is shown in FIG. 23. Once the volume-averaged viscosity of the sample fluid stopped increasing and maintained a fairly constant value, the particulate slurry was considered settled. As shown in FIG. 23, the sample fluids comprising mixtures of KELCO EX9396 xanthan and guar exhibited particulate suspension capabilities similar to that of a fluid comprising only the BARAZAN D® gelling agent.

Example 6

Sample Fluid 63 (a standard linear guar gel) was prepared by mixing 45 pptg of WG-36™ guar gelling agent in a solution of 1% by weight sodium chloride in tap water. Sample Fluid 64 was prepared by mixing 80 pptg WG-37™ gelling agent in a solution of 1% by weight sodium chloride in tap water. Sample Fluid 65 was prepared by mixing 70 pptg BARAZAN D® in a solution of 1% by weight sodium chloride in tap water. The viscosities of Sample Fluids 63, 6, and 65 were measured at 25° C. on a Fann® 35 steady shear viscometer with an R1 sleve and B1 bob and a steady shear rate of 511 s$^{-1}$, and were found to be substantially equal.

Figure 24:
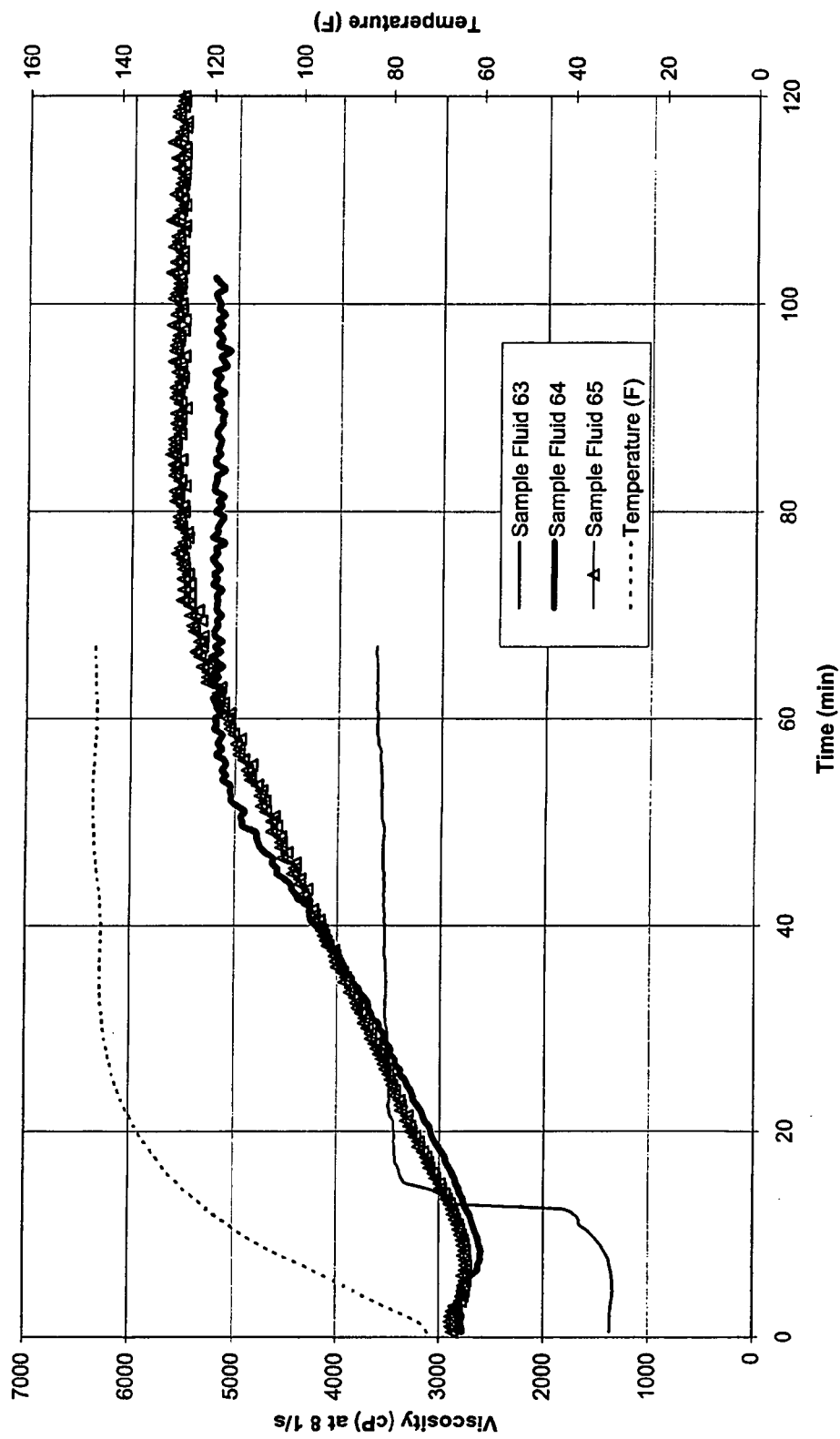
FIG. 24 illustrates data regarding certain properties of various treatment fluids, some of which represent embodiments of the treatment fluids of the present invention.
Figure 25:
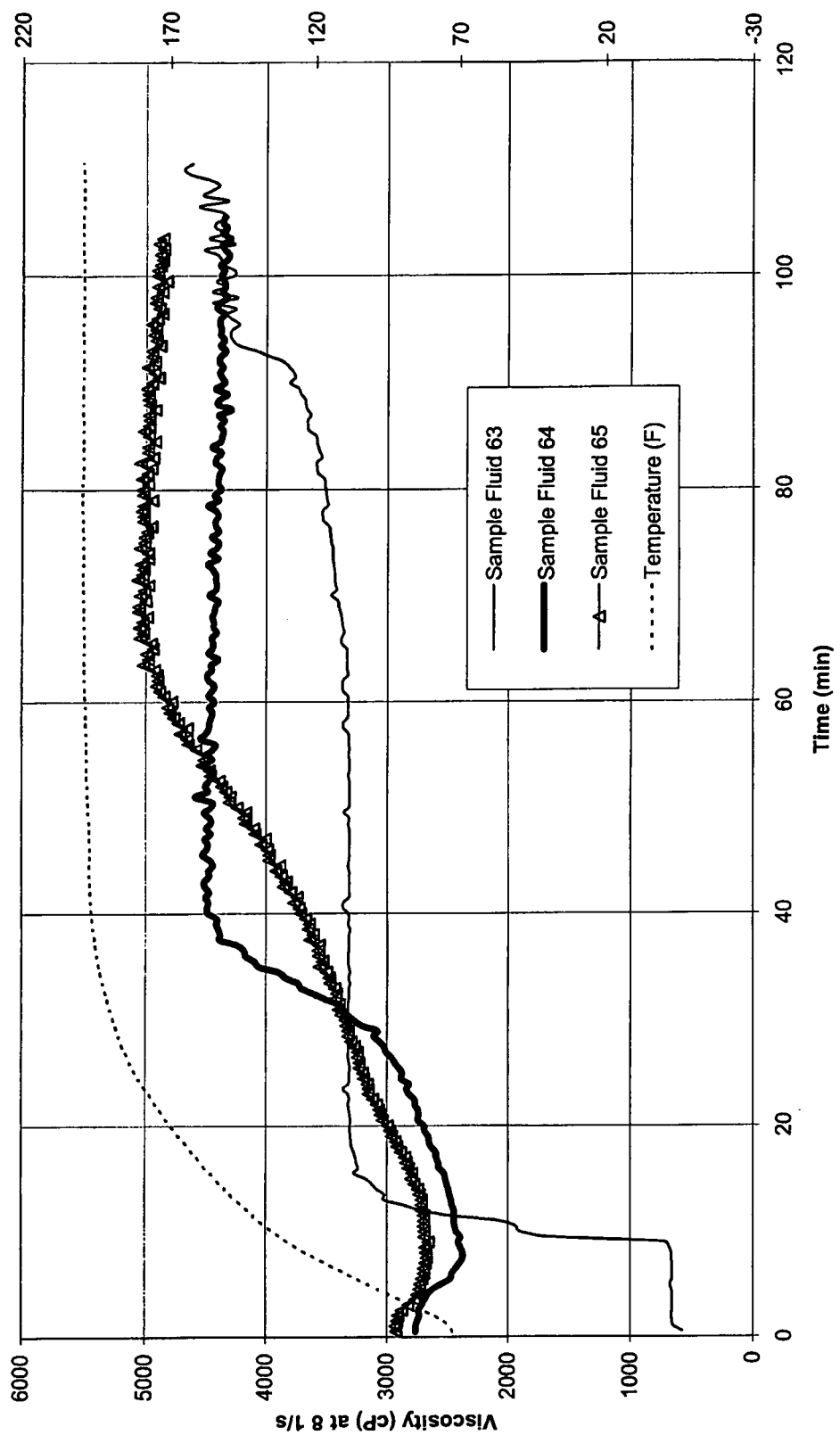
FIG. 25 illustrates data regarding certain properties of various treatment fluids, some of which represent embodiments of the treatment fluids of the present invention.

Each of the three sample fluids were mixed with 9 pounds per gallon (ppg) of 30/50 ECONOPROP® particulate material (available from CARBO Ceramics, Inc., Irving, Tex.) to form uniform slurries. The slurries were each placed in the cup of a device known as a MIMIC™ proppant transport measuring system (available from Halliburton Energy Services). The MIMIC™ device used was similar to the device described in FIG. 2 of U.S. Pat. No. 6,782,735, except that the design of the cup was modified as shown in FIG. 8 of this specification. The sample fluids were tested by raising the temperature to a target temperature and volume-averaged viscosity data was collected over a 120-minute period on the MIMIC™ device using a volume-averaged shear rate of 8 s$^{-1}$. A plot of the volume-averaged viscosity of each sample fluid is shown in FIGS. 24 and 25 (target temperatures of 150° F. and 200° F., respectively). Once the volume-averaged viscosity of the sample fluid stopped increasing and maintained a fairly constant value, the particulate slurry was considered settled. As shown, Sample Fluid 63 (standard linear guar gel) settled after 14 minutes and 13 minutes at 150° F. and 200° F., respectively, whereas Sample Fluid 64 settled after 55 minutes and 39 minutes and Sample Fluid 65 settled after 70 minutes and 62 minutes at the same temperatures.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, all numbers and numerical ranges disclosed include the term "about," whether or not stated, and may vary by any amount (e.g., 1 percent, 2 percent, 5 percent, or, sometimes, 10 to 20 percent). Moreover, every range of numerical values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. For example, whenever a numerical range, R, with a lower limit, RL, and an upper limit, RU, is disclosed, any number falling within the range is specifically disclosed. In particular, the following numbers within the range are specifically disclosed: R=RL+k*(RU−RL), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Moreover, the indefinite articles "a" and "an", as used in the claims, are defined herein to mean one or more than one of the element that they introduce. Also, the terms in the claims have their plain, ordinary meaning unless otherwise explicitly and clearly defined by the patentee.

What is claimed is:

1. A method comprising:
   providing a linear gelled fluid that comprises an aqueous base fluid, a plurality of particulates, and a linear particulate transport enhancing additive, wherein the linear particulate enhancing additive is a polymeric material that forms a gel in the presence of an aqueous fluid and that imparts at least one of the following properties to the linear gelled fluid:
   (a) a yield stress that satisfies the following inequality:

$$\frac{(\rho_p - \rho_f)g_c R}{\tau_0} < 3$$

wherein $\tau_o$ is the yield stress in units of Pascals, wherein $\rho_p$ is the mean density of the particulates with units of kilograms per meter cubed, $\rho_f$ is the density of the fluid with units of kilograms per meter cubed, $g_c$ is the gravitational acceleration constant defined as 9.8 meters per second squared, R is the mean radius of the particulates with units of meters,
   (b) a crossover frequency at the temperature in a portion of a subterranean formation where the linear gelled fluid is introduced of less than about 0.01 radians per second, or
   (c) a particulate settling time of the linear gelled fluid that is at least about 300 percent longer than the particulate settling time of a standard linear guar gel;
   introducing the linear gelled fluid into a portion of a subterranean formation; and
   using the linear gelled fluid to create or enhance at least one fracture in at least a portion of the subterranean formation.

2. The method of claim 1 wherein the linear gelled fluid has all of the properties in (a), (b), and (c).

3. The method of claim 1 wherein the linear particulate transport enhancing additive is present in the linear gelled fluid in an amount of less than about 20 pounds per thousand gallons of the linear gelled fluid.

4. The method of claim 1 wherein the linear particulate transport enhancing additive is present in the linear gelled fluid in an amount of from about 20 pounds to about 90 pounds per thousand gallons of the linear gelled fluid.

5. The method of claim 1 wherein the temperature in the portion of the subterranean formation is at least about 150° F.

6. The method of claim 1 wherein the linear particulate enhancing additive imparts the following properties to the linear gelled fluid:
   a yield stress that satisfies the following inequality:

$$\frac{(\rho_p - \rho_f)g_c R}{\tau_0} < 3$$

wherein $\tau_o$ is the yield stress in units of Pascals, wherein $\rho_p$ is the mean density of the particulates with units of kilograms per meter cubed, $\rho_f$ is the density of the fluid with units of kilograms per meter cubed, $g_c$ is the gravitational acceleration constant defined as 9.8 meters per second squared, R is the mean radius of the particulates with units of meters; and
   a crossover frequency that is less than about 0.01 radians per second.

7. The method of claim 1 wherein the aqueous base fluid comprises produced water.

8. A method comprising:
   providing a linear gelled fluid that comprises an aqueous base fluid, a plurality of particulates, and a linear particulate transport enhancing additive, wherein the linear particulate enhancing additive is a polymeric material that forms a gel in the presence of an aqueous fluid and that imparts at least one of the following properties to the linear gelled fluid:
   (a) a yield stress that satisfies the following inequality:

$$\frac{(\rho_p - \rho_f)g_c R}{\tau_0} < 3$$

wherein $\tau_o$ is the yield stress in units of Pascals, wherein $\rho_p$ is the mean density of the particulates with units of kilograms per meter cubed, $\rho_f$ is the density of the fluid with units of kilograms per meter cubed, $g_c$ is the gravitational acceleration constant defined as 9.8 meters per second squared, R is the mean radius of the particulates with units of meters, (b) a crossover frequency at the temperature in a portion of a subterranean formation where the linear gelled fluid is introduced of less than about 0.01 radians per second, or (c) a particulate settling time of the linear gelled fluid that is at least about 300 per cent longer than the particulate settling time of a standard linear guar gel;

introducing the linear gelled fluid into a portion of a subterranean formation, wherein the subterranean formation comprises at least one fracture; and depositing at least a portion of the particulates in a portion of a fracture in the subterranean formation.

9. The method of claim 8 wherein the linear gelled fluid has all of the properties in (a), (b), and (c).

10. The method of claim 8 wherein the linear particulate transport enhancing additive is a polymeric additive.

11. The method of claim 8 wherein the linear particulate transport enhancing additive is present in the linear gelled fluid in an amount of from about 20 pounds to about 90 pounds per thousand gallons of the linear gelled fluid.

12. The method of claim 8 wherein the linear particulate enhancing additive imparts the following properties to the linear gelled fluid:

a yield stress that satisfies the following inequality:

$$\frac{(\rho_p - \rho_f)g_c R}{\tau_0} < 3$$

wherein $\tau_o$ is the yield stress in units of Pascals, wherein $\rho_p$ is the mean density of the particulates with units of kilograms per meter cubed, $\rho_f$ is the density of the fluid with units of kilograms per meter cubed, $g_c$ is the gravitational acceleration constant defined as 9.8 meters per second squared, R is the mean radius of the particulates with units of meters; and a crossover frequency that is less than about 0.01 radians per second.

* * * * *